US008547572B2

(12) United States Patent
Tsuboi

(10) Patent No.: US 8,547,572 B2
(45) Date of Patent: Oct. 1, 2013

(54) IMAGE PROCESSING APPARATUS, IMAGE PROCESSING SYSTEM, RECORDING MEDIUM, AND METHOD FOR TRANSMITTING URL INFORMATION OF A WEB BROWSER

(75) Inventor: Tomo Tsuboi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1384 days.

(21) Appl. No.: 11/839,661

(22) Filed: Aug. 16, 2007

(65) Prior Publication Data

US 2008/0043282 A1 Feb. 21, 2008

(30) Foreign Application Priority Data

Aug. 18, 2006 (JP) .................................. 2006-223504

(51) Int. Cl.
*G06F 3/12* (2006.01)
*G06F 15/16* (2006.01)

(52) U.S. Cl.
USPC ........................................... 358/1.15; 709/203

(58) Field of Classification Search
None
See application file for complete search history.

(56) References Cited

U.S. PATENT DOCUMENTS

| 7,698,256 | B1* | 4/2010 | Wang | 709/203 |
| 2001/0050782 | A1* | 12/2001 | Niitsuma et al. | 358/1.15 |
| 2005/0071500 | A1* | 3/2005 | Tonegawa | 709/236 |
| 2005/0289126 | A1* | 12/2005 | Koguchi | 707/3 |
| 2006/0133829 | A1* | 6/2006 | Kato | 399/8 |
| 2006/0176509 | A1* | 8/2006 | Aoki et al. | 358/1.15 |
| 2006/0262349 | A1* | 11/2006 | Moroi | 358/1.15 |
| 2006/0277455 | A1* | 12/2006 | Yamada et al. | 715/501.1 |

FOREIGN PATENT DOCUMENTS

| JP | 08-272721 | 10/1996 |
| JP | 11-338810 A | 12/1999 |
| JP | 2003-186777 | 7/2003 |
| JP | 2004-272779 A | 9/2004 |
| JP | 2005-235034 A | 9/2005 |
| JP | 2006-031598 | 2/2006 |
| JP | 2006-146912 | 6/2006 |

OTHER PUBLICATIONS

Notification of Reasons for Rejection in JP 2006-223504 dated Sep. 9, 2008, and English Translation thereof.

* cited by examiner

*Primary Examiner* — Vincent Rudolph
(74) *Attorney, Agent, or Firm* — Buchanan Ingersoll & Rooney PC

(57) ABSTRACT

An image processing apparatus realizes easy access with a Web browser of a terminal apparatus to a URL that has been accessed with a Web browser of the image processing apparatus. The image processing apparatus comprises a unit for managing URLs accessed by a user with a Web browser of a terminal apparatus in association with a user name of the user and a location of a terminal apparatus corresponding to the user name, and a unit for transmitting the URL to the location of the terminal apparatus.

21 Claims, 24 Drawing Sheets

FIG.3A

URL HISTORY TABLE

33

| URL HISTORY (USER NAME: A) | LAST ACCESS TIME | ACCESS DURING CURRENT LOGIN | URL MANUAL INPUT | UPLOADING | PULL-PRINTING |
|---|---|---|---|---|---|
| http://10.YY.13.231/ | 2006/4/25 18:00 | — | ○ | — | ○ |
| http://konicaminolta.jp/ | 2006/4/26 12:00 | ○ | ○ | — | ○ |
| http://www.jpo.go.jp/ | 2006/4/26 12:05 | ○ | — | — | — |

FIG.3B

URL ADDRESS BOOK TABLE

34

| URL ADDRESS BOOK (USER NAME: A) |
|---|
| http://10.XX.16.100/ |
| http://www.uspto.gov/ |

FIG.4

USER MANAGEMENT TABLE

37

| MFP LOGIN INFORMATION | | NOTIFICATION-DESTINATION PC INFORMATION (ACQUISITION-SOURCE PC INFORMATION) | | | | |
|---|---|---|---|---|---|---|
| USER NAME | PASSWORD | IP ADDRESS | LOGIN USER NAME FOR PC | PASSWORD | URL HISTORY DIRECTORY PATH | URL ADDRESS BOOK DIRECTORY PATH |
| A | aaa | 10.XX.16.2 | ABC | abb | C:/Documents and... | C:/Documents... |
| B | bbb | 10.XX.16.3 | BB | baa | D:/Program Files... | D:/Program Files... |
| ... | ... | ... | ... | ... | ... | ... |

FIG.23

MFP INFORMATION MANGEMENT TABLE

| PC LOGIN INFORMATION || NOTIFICATION-DESTINATION MFP INFORMATION |||
|---|---|---|---|---|
| USER NAME | PASSWORD | IP ADDRESS | LOGIN USER NAME FOR MFP | PASSWORD |
| BB | baa | 10.XX.16.100 | B | bbb |

IMAGE PROCESSING APPARATUS, IMAGE PROCESSING SYSTEM, RECORDING MEDIUM, AND METHOD FOR TRANSMITTING URL INFORMATION OF A WEB BROWSER

This application is based on application NO. 2006-223504 filed in Japan, the content of which is hereby incorporated by reference.

BACKGROUND OF THE INVENTION (1) Field of the Invention

The present invention relates to an image processing apparatus or the like equipped with a Web browser.

(2) Description of the Related Art

An MFP (Multi Function Peripheral) as an image processing apparatus has several functions, such as functions of copying, printing, scanning and a fax.

In recent years, MFPs having a function of Web browser have emerged. With such MFPs, a user can use a Web browser on an operation panel of the main body of the MFP.

By applying such apparatuses, the user can access a desired URL from the MFP.

Meanwhile, there is a demand that after accessing a URL using a Web browser built in a MFP, the user wishes to access the same URL from another terminal apparatus such as a PC.

In such a case, there is a problem of poor usability that the user has to write down the URL accessed with the Web browser of the MFP, and then manually input the URL in the address bar of the Web browser of the terminal apparatus.

In the same manner, in the case of accessing the URL which the user has accessed before with the Web browser of the terminal apparatus with the Web browser of the MFP, there is the same problem of the poor usability.

SUMMARY OF THE INVENTION

The present invention is made in terms of the problem above. The object of the present invention is to provide an image processing apparatus that can easily access, by a Web browser of a terminal apparatus, a URL that the user has previously accessed by a Web browser of the image processing apparatus.

To fulfill the object above, an aspect of the present invention contemplates an image processing apparatus connectable to a terminal apparatus via a network, comprising: a Web browser operable to perform browsing in response to operations by users; a URL manager operable to manage pieces of URL information each including a list of URLs accessed by one of the users using the Web browser and a user name of the one of the users; a user terminal manager operable to manage notification destination information including user names of the users and locations of terminal apparatuses respectively corresponding to the user names; an extractor operable to extract a piece of the URL information that relates to a given one of the user names; and a transmitter operable to transmit the extracted piece of the URL information to one of the locations that corresponds to the given one of the user names indicated by the notification destination information.

With the stated structure, for example, if the user uses the list of the URLs included in the URL information with the Web browser of the terminal apparatus that has been received the URL information, the user can easily access the URL that the user has accessed before with the Web browser of the image processing apparatus.

Another aspect of the present invention contemplates an image processing system including an image processing apparatus and a terminal apparatus connected thereto via a network, the image processing apparatus comprising: a Web browser operable to perform browsing in response to operations by users; a URL manager operable to manage pieces of URL information each including a list of URLs accessed by one of the users using the Web browser and a user name of the one of the users; a user terminal manager operable to manage notification destination information including user names of the users and locations of terminal apparatuses respectively corresponding to the user names; an extractor operable to extract a piece of the URL information that relates to a given one of the user names; and a transmitter operable to transmit the extracted piece of the URL information to one of the locations that corresponds to the given one of the user names indicated by the notification destination information.

With the stated structure, the user can use the list of URLs included in the URL information with the Web browser of the terminal apparatus that has received the URL information. Therefore, the user can easily access the URL that the user has accessed before with the Web browser of the image processing apparatus.

Another aspect of the present invention contemplates an image processing apparatus connectable to a terminal apparatus via a network, comprising: a Web browser operable to perform browsing in response to operations by users; a URL storing part operable to store pieces of URL information each including a list of URLs accessed by one of the users using the Web browser and a user name of the one of the users that has accessed the URLs; and a provider operable to specify a user name of one of the users that uses a terminal apparatus from which a provision request has been transmitted, extract a piece of the URL information that relates to the specified user name, and provide the terminal apparatus with the extracted piece of the URL information.

With the stated structure, the user of the terminal apparatus that has been provided with the extracted URL information can easily access the URL again that the user has accessed before with the Web browser of the image processing apparatus.

Another aspect of the present invention contemplates an image processing apparatus connectable to a terminal apparatus having a first Web browser via a network, the image processing apparatus comprising: a second Web browser operable to perform browsing in response to operations by users; a user terminal manager operable to manage acquisition source information including user names of the users and locations of terminal apparatuses respectively corresponding to the user names; an identifier operable to identify a user name of one of the users that uses the second Web browser; and an acquisition part operable to acquire a piece of URL information including a list of URLs accessed by the one of the users using the first Web browser, from one of the locations that corresponds to the user name.

With the stated structure, the user can use the list of the URLs included in the URL information acquired by the acquisition part, with the second browser. Therefore, with the second Web browser, the user can easily access the URL that the user has accessed before with the first Web browser.

Another aspect of the present invention contemplates an image processing system including an image processing apparatus and a terminal apparatus connected thereto via a network, the terminal apparatus comprising: a first Web browser operable to perform browsing in response to operations by users; an apparatus manger operable to manage notification destination information including user names of the users and a location of the image processing apparatus; a transmitter operable to transmit pieces of URL information, each including a list of URLs accessed by one of the users using the first Web browser, to the location of the image processing apparatus indicated by the notification destination information, and the image processing apparatus comprising: a second Web browser operable to perform browsing in response to operations by the users; a receiver operable to receive the pieces of URL information transmitted by the transmitter; and a URL storing part operable to store the pieces of URL information in association with the user names.

With the stated structure, with the second Web browser, the user can easily access the URL that the user has accessed before with the first Web browser.

Another aspect of the present invention contemplates computer-readable recording medium that is readable by a computer connectable to an image processing apparatus via a network, and has recorded thereon a computer program that causes a computer to execute: a Web browsing step of accessing URLs; a URL managing step of managing pieces of URL information each including a list of the URLs; an apparatus managing step of managing notification destination information including user names of users of the image processing apparatus and a location of the image processing apparatus; and a transmitting step of associating the pieces of URL information managed in the URL managing step with the user names and transmitting the pieces of URL information to the location of the image processing apparatus indicated by the notification destination information.

With the stated structure, using the second Web browser, the user can easily access the desired URL that the user has accessed before with the first Web browser.

Another aspect of the present invention contemplates a method for transmitting browser configuration information used by an image processing apparatus connectable to a terminal apparatus via a network, the method comprising: a Web browsing step of accessing URLs in response to operations by users; a URL managing step of managing pieces of URL information each including a list of URLs accessed by one of the users using a Web browser and a user name of the one of the users that has accessed the URLs; a user terminal managing step of managing notification destination information including user names of the users and locations of terminal apparatuses respectively corresponding to the user names; an extracting step of extracting a piece of the URL information that relates to a given one of the user names; and a transmitting step of transmitting the extracted piece of the URL information to one of the locations that corresponds to the given one of the user names indicated by the notification destination information.

With the stated structure, with the image processing apparatus, the user can easily access the URL that the user has accessed before with the computer.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3A shows a URL history table 33;

FIG. 3B shows a URL address book table 34;

FIG. 4 shows a user management table 37;

FIG. 23 shows an MFP information management table 121;

DESCRIPTION OF THE PREFERRED EMBODIMENT

The following describes the preferred embodiments of the present invention, with reference to the drawings.

The First Embodiment

<Structure>

Figure 1:
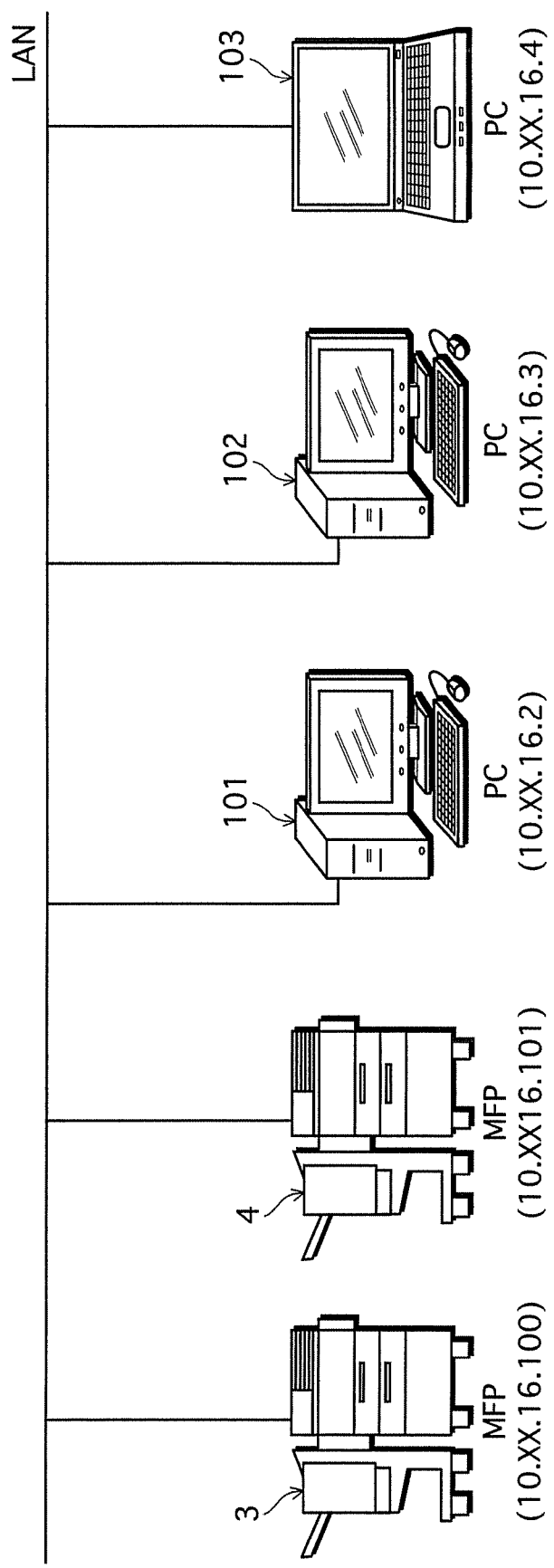
FIG. 1 shows a system structure of an image processing system 1 according to the first embodiment.

As FIG. 1 shows, an image processing system 1 includes an MFP (Multi Function Peripheral) 3, an MFP 4, a PC (Personal Computer) 101, a PC 102, and a PC 103, which are connected together via a LAN (Local Area Network) cable.

Figure 2:
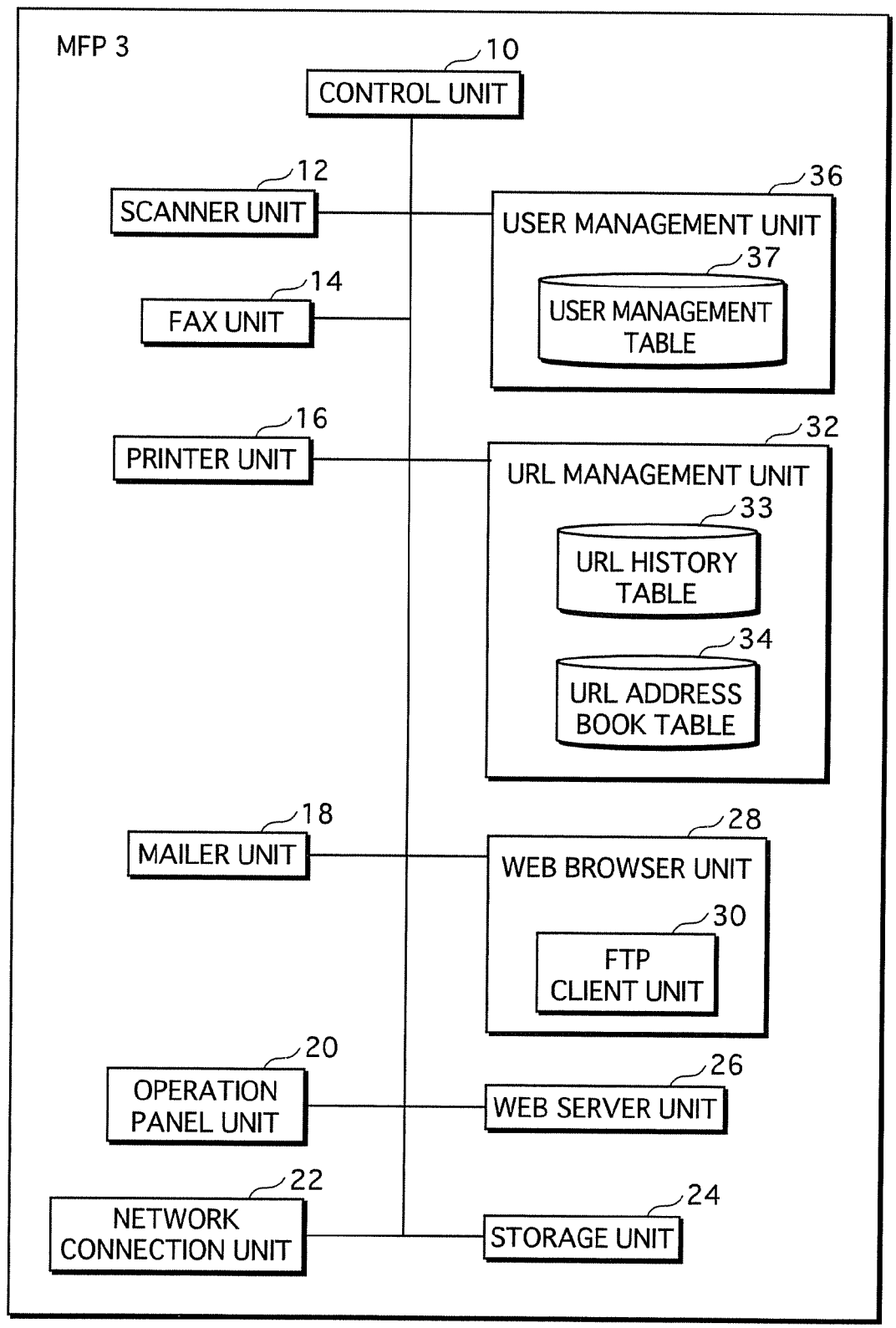
FIG. 2 is a functional block diagram showing a structure of an MFP 3.

As FIG. 2 shows, the MFP 3 includes a control unit 10, a scanner unit 12, a FAX unit 14, a printer unit 16, a mailer unit 18, a navigational panel unit 20, a network connection unit 22, a storage unit 24, a Web server unit 26, a Web browser unit 28, a URL management unit 32, and a user management unit 36.

The control unit 10 is structured with hardware, such as a CPU, a RAM and a ROM, and controls overall operations of the units included in the MFP 3.

The scanner unit 12 creates image data by scanning a document.

The FAX unit 14 realizes a facsimile function.

The printer unit 16 prints image data on a paper.

The mailer unit 18 sends, receives and manages E-mails.

The navigational panel unit 20 is a functional block that accepts input operations from a user while displaying information to the user. The operation panel unit 20 includes a touch panel and a push button key (fixed input key).

The touch panel is arranged on the top surface of the body of the apparatus, for example. When touched by the user, the touch panel displays available input keys in accordance with the position touched by the user. The screen size of the touch panel is approximately 10 inches.

The network connection unit 22 is a functional block that establishes network connections (communications).

The storage unit 24 stores various types of data used by the MFP 3. For example, image data is stored.

The Web server unit 26 is a functional block that realizes a Web server function. According to a request from a client PC, the Web server unit 26 creates a Web page source (source information of a Web page) in HTML format (or XML format) including URL information, and provides the requesting client PC with the created Web page source.

The Web browser unit 28 (i) acquires (downloads) the Web page source by transmitting a HTTP request to a designated URL (Uniform Resource Locator) and analyzes the Web page source, and (ii) displays a Web page based on the source in a format that is easy to read for the user.

The Web browser unit 28 includes a FTP client unit 30. The FTP client unit 30 uploads files to a FTP server and downloads files from the FTP server, using FTP (File Transfer Protocol).

The URL management unit 32 includes a URL history table 33 and a URL address book table 34.

The user management unit 36 includes a user management table 37.

The MFP 4 has the same structure as the MFP 3. Therefore, the explanation thereof is omitted here.

Next, the structures of the URL history table 33, the URL address book table 34, and the user management table 37 are explained one by one.

As FIG. 3A shows, the URL history table 33 includes items namely "URL history", "last access time", "access during current login", "URL manual input", "uploading" and "pull-printing".

The item "URL history" shows a list of URLs that have been accessed by the Web browser unit 28. The URLs accessed by the Web browser unit 28 includes URLs to which data have been uploaded by the FTP client unit 30 as well as URLs from which data is downloaded to be browsed.

The item "access during current login" indicates a URL accessed during the current login by a sign "o", and a URL accessed during previous logins by a sign "–".

The item "URL manual input" shows whether the URL has been manually input in the address bar of the Web browser unit 30.

The item "pull-printing" shows whether printing of a file corresponding to the URL has been executed.

As FIG. 3B shows, the item "URL address book" shows a list of URLs registered in the URL address book of the Web browser unit 28.

The list of the registered URLs is used for an address book function of the Web browser unit 28. The address book function is the same as the so-called "favorite function" and "bookmark function", which is well-known Web browser function that realizes easy access to the URLs registered by the user.

Note that the table 33 shown in FIG. 3A and the table 34 shown in FIG. 3B show only information relating to a user A. However, such a history table is constructed for each of users B, C and D as well as for the user A.

As FIG. 4 shows, the user management table 37 includes two major items, namely "MFP login information" and "notification-destination PC information".

The "MFP login information" is constituted of a pair of "user name" and "password", which are information required for logging in to the MFP 3.

The "notification-destination PC information" includes items namely "IP address", "login user name for PC", "password", "URL history directory path", and "URL address book directory path".

The "IP address" shows an IP address of a notification-destination PC as a notification destination of the URL information. The pair of the "login user name for PC" and the "password" is used for obtaining a right to use the notification-destination PC specified by the IP address.

Information used for specifying the notification-destination PC is not limited to the IP address, and any other information may be used in accordance with the network environment. For example, a host name of the PC, and a physical address (MAC address) of the PC may be used. Also, in the case of a name resolution environment using a DNS (Domain Name System) server or the like, a name allocated to the PC may be used.

The items "URL history directory path" and "URL address book directory path" are directory paths (character strings showing the locations of the folders) of the URL history and the URL address book.

The following briefly explains the notification destination of the user name A. An IP address "10.XX.16.2" represents the location on the network of a PC used by the user having the user name A. The sign "C:" included in the directory path of the URL history is a drive letter of a storage device (HDD) included in the PC.

The directory path of the "URL history" is the same as the directory path at/from which the Web browser of the notification-destination PC saves/reads the URL history. This is for simplifying the use of the URL history from the Web browser of the notification-destination PC.

Accordingly, when the Web browser of the notification-destination PC is started up, files located under the URL history directory are to be read as the URL history. This is the same as to the directory path of the URL address book.

Figure 5:
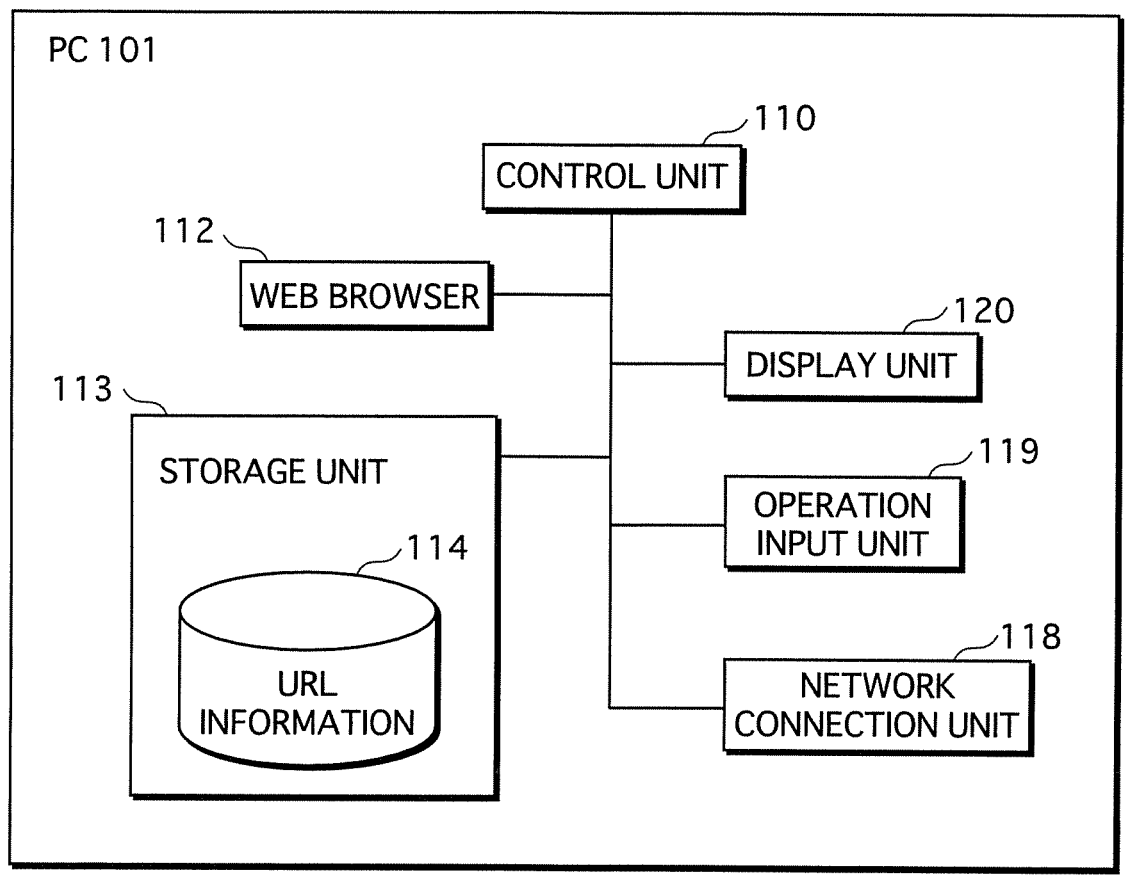
FIG. 5 is a functional block diagram showing a structure of a PC 101.

As FIG. 5 shows, the PC 101 includes a control unit 110, a Web browser 112, a storage unit 113, a network connection unit 118, an operation input unit 119 and a display unit 120.

The control unit 110 is structured with hardware, such as a CPU, a RAM and a ROM, and controls overall operations of the units included in PC 101.

The network connection unit 118 establishes network connections.

The Web browser 112 is structured with the Internet Explorer™, for example, and has a URL address book function (favorite function) for realizing easy access to the registered URLs and a URL history function for realizing easy re-access to URLs that have been accessed by the user in the past.

The storage unit 113 is structured with hardware such as a HDD, and includes URL information 114. The URL information 114 includes a URL list used for the URL address book function and the URL history function of the Web browser 112.

The operation input unit 119 is structured with hardware such as a mouse and a keyboard, and accepts input operations from the user.

The display unit 120 displays various types of information on a display screen of an LCD monitor.

<Operations>

The following explains operations of the MFP 3 and the PC 101 based on an example case where a user A uses the Web browser of the MFP 3 and then uses the Web browser of the PC 101 later.

Figure 6:
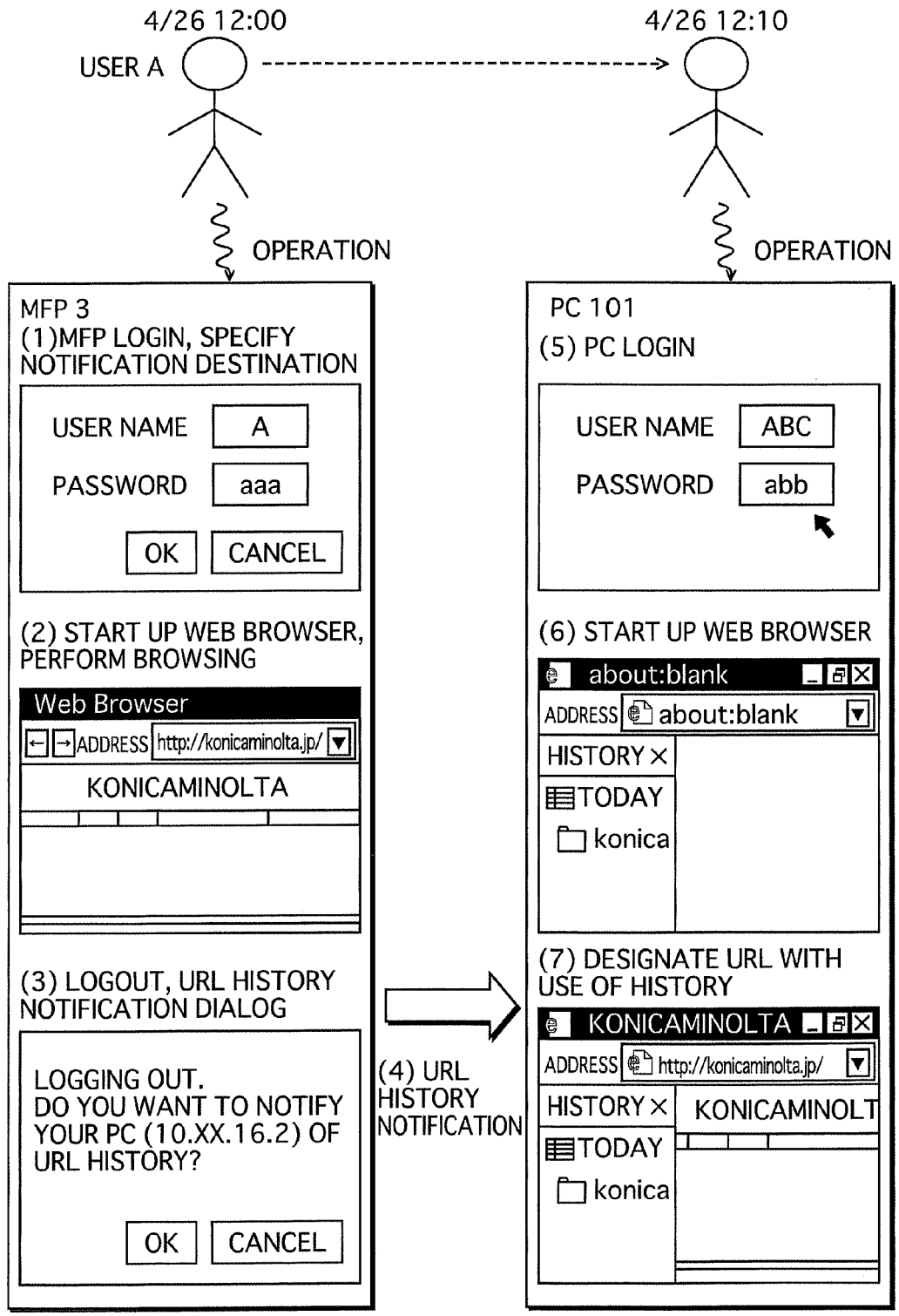
FIG. 6 shows transitions of display screens of the MFP 3 and the PC 101 in the case where a user A uses a Web browser of the MFP 3 and then uses a Web browser 112 of the PC 101 later.

As FIG. 6 shows, the operations can be summarized as follow.

(1) The MFP 3 accepts login of the user A, and specifies the PC of the user A as the URL history notification destination, based on the login user name.

(2) The user A starts up the Web browser of the MFP 3, and the Web browser performs browsing in response to operations input by the user A.

(3) When the user A logs out (or the Web browser is terminated), the MFP 3 displays a dialog box indicating whether to provide a notification of the URL history.

(4) In the case of providing the notification, the URL history is notified to the PC 101 of the user A.

(5) The PC 101 accepts login of the user A.

(6) The user A starts up the Web browser of the PC 101.

(7) The user A designates a URL using the notified URL history.

Figure 7:
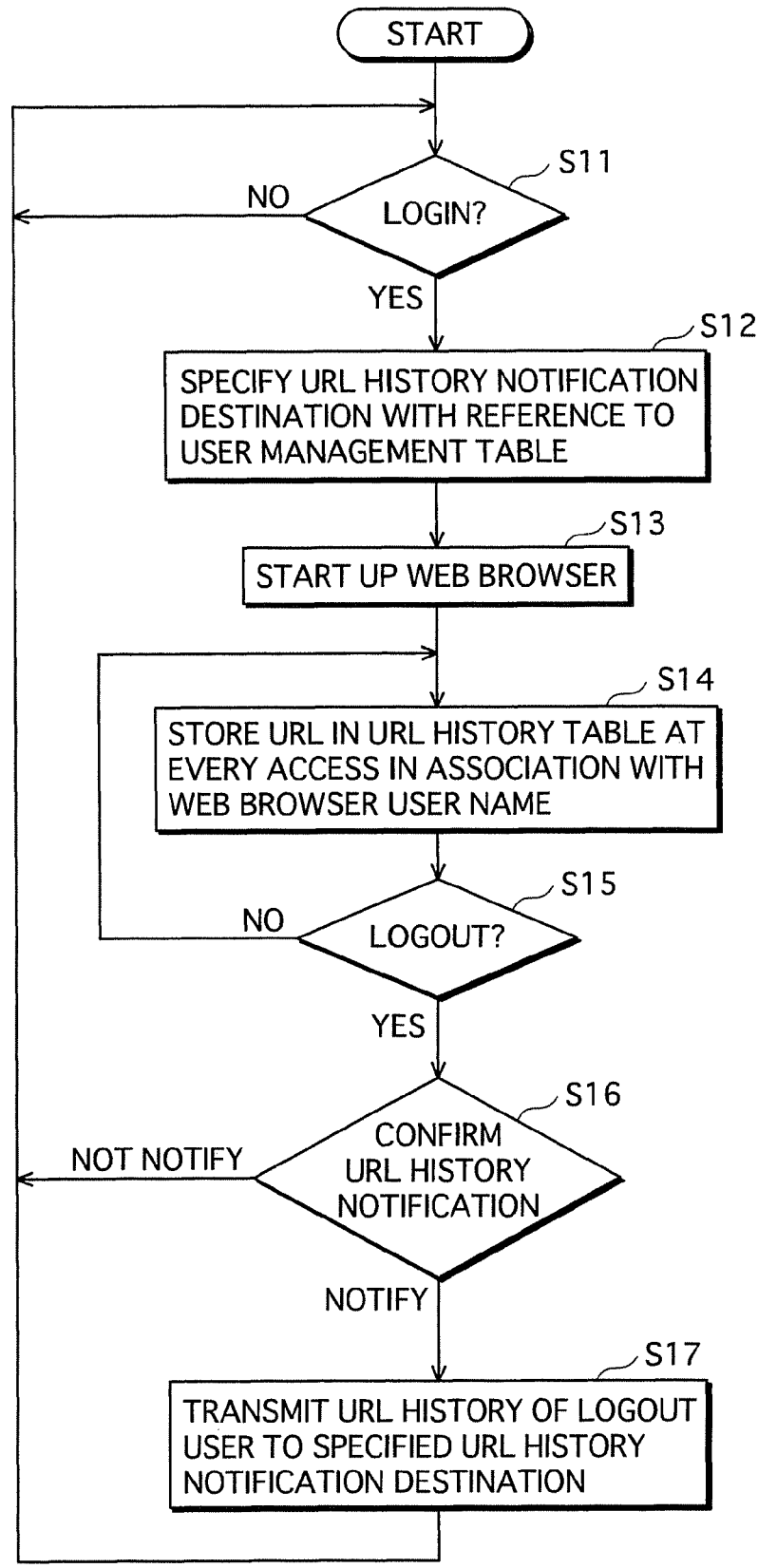
FIG. 7 is a flowchart showing processing performed by a control unit 10 of the MFP 3 for specifying a URL history notification destination, storing a URL history, and notifying (transmitting) the URL history.

As FIG. 7 shows, upon accepting the login by receiving the user name and the password (S11: YES), the MFP 3 specifies the URL history notification destination corresponding to the login user name, with reference to the user management table 37 (S12). For example, if the login user name is the user A, the directory path "C:/Documents and . . . " of the PC located at the IP address "10.XX.16.2" is to be specified as the notification destination.

After the Web browser of the MFP 3 is started up (S13), every time the user accesses a URL, the URL is stored in the URL history table in association with the Web browser user name (S14). The Web browser user name is the user name that is in the log-in status.

If the user logs out (S15), a URL history notification dialog is displayed on the touch panel to confirm the user's intention (S16).

If the user selects the notification of the history (S16: Notify), the MFP 3 extracts items of the URL history that relate to the user that has logged out and whose access times are within the final login period (items whose "access during current login" is "o") from the URL history table 33, and transmits the extracted items to the specified URL history notification destination (S17). For this transmission, methods such as SMB (Server Message Block) and FTP are used.

Note that not only the URL history but also the URL address book may be stored and notified in the processing relating to the flowchart shown in FIG. 7.

If the URLs whose access times are within the final login period are transmitted as items of the URL history, the user can easily access, with use of the browser of the PC 101, the URLs that the user most recently accessed. As a matter of course, the access time is not limited to be within the final login period. In view of the management load and the network load, the items of the history included within a recent period (e.g. in the previous three days) or within a period designated by the user may be transmitted.

Next, processing for storing the URL history is explained.

Figure 8:
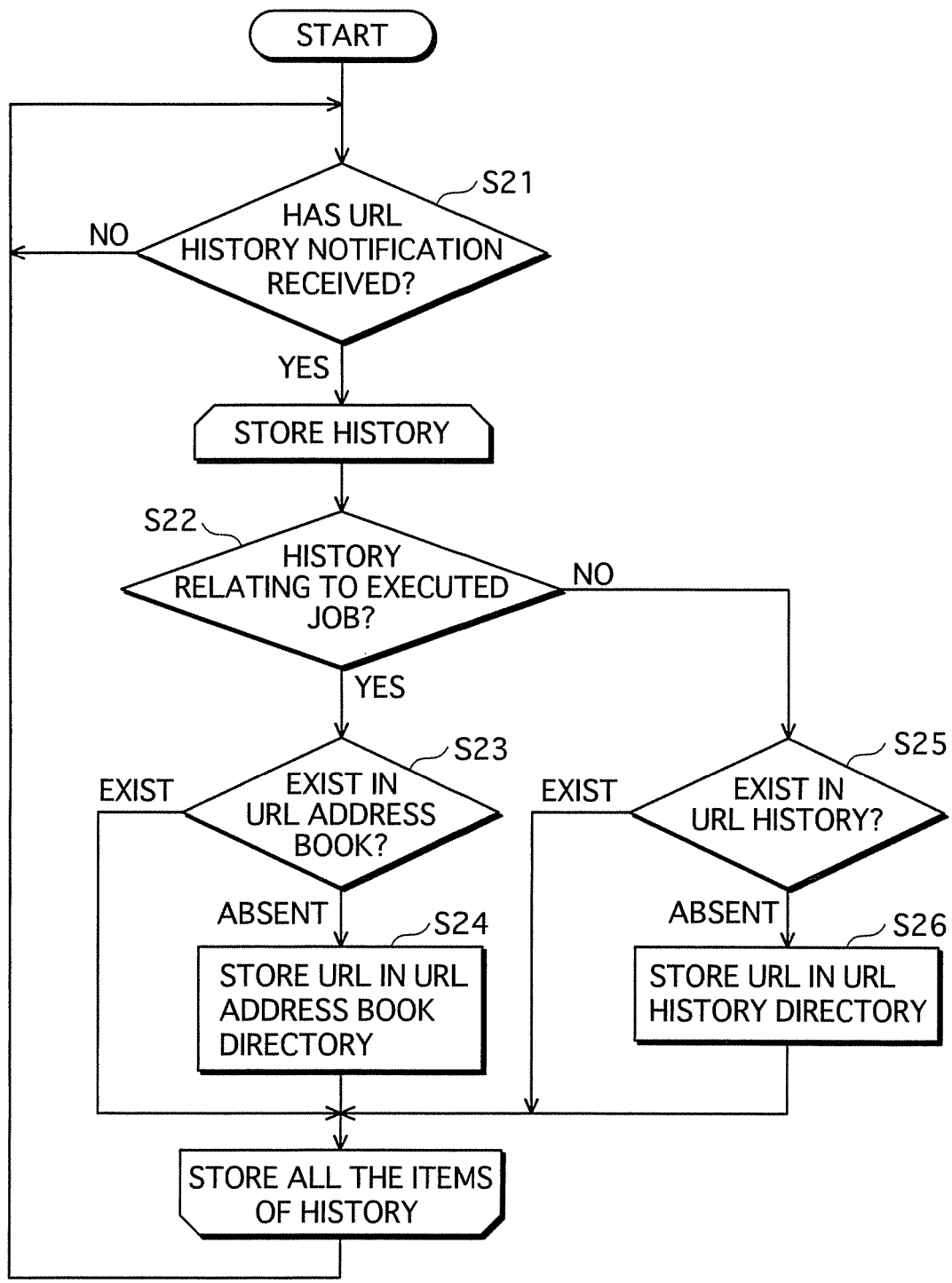
FIG. 8 is a flowchart showing processing performed by a control unit 110 of the PC 101 for storing a received URL history.

As shown in FIG. 8, upon receiving the URL history notification (S21), the MFP 3 repeats Steps S22 to S26 for storing the items of the history until all the items are stored.

If the stored items of the URL history are related to Jobs executed by the MFP 3 (S22: Yes) and if the same items do not exist in the URL address book (S23: Absent), the addresses are to be stored in the address book directory (S24).

Items of the URL history related to Jobs executed by the MFP 3 are URLs as to which Jobs such as the pull-printing and the uploading (see FIG. 3) (which relates to specific operations, not just a simple browsing) have been executed by the MFP 3. Since URLs relating to such Jobs are highly possibly used again, the URLs are to be stored in the URL address book. Furthermore, URLs not relating to the Job execution (S22: No) but not existing in the URL history (S25: Absent) are to be stored in the URL history directory (S26).

As described above, according to the first embodiment, the user can easily access the URLs that the user has accessed before with the Web browser of the MFP 3, with the Web browser 112 of the PC 101, because the user can use the URL history function of the Web browser 112.

Next, two modification examples relating to the first embodiment are explained.

Modification Example 1

Figure 9:
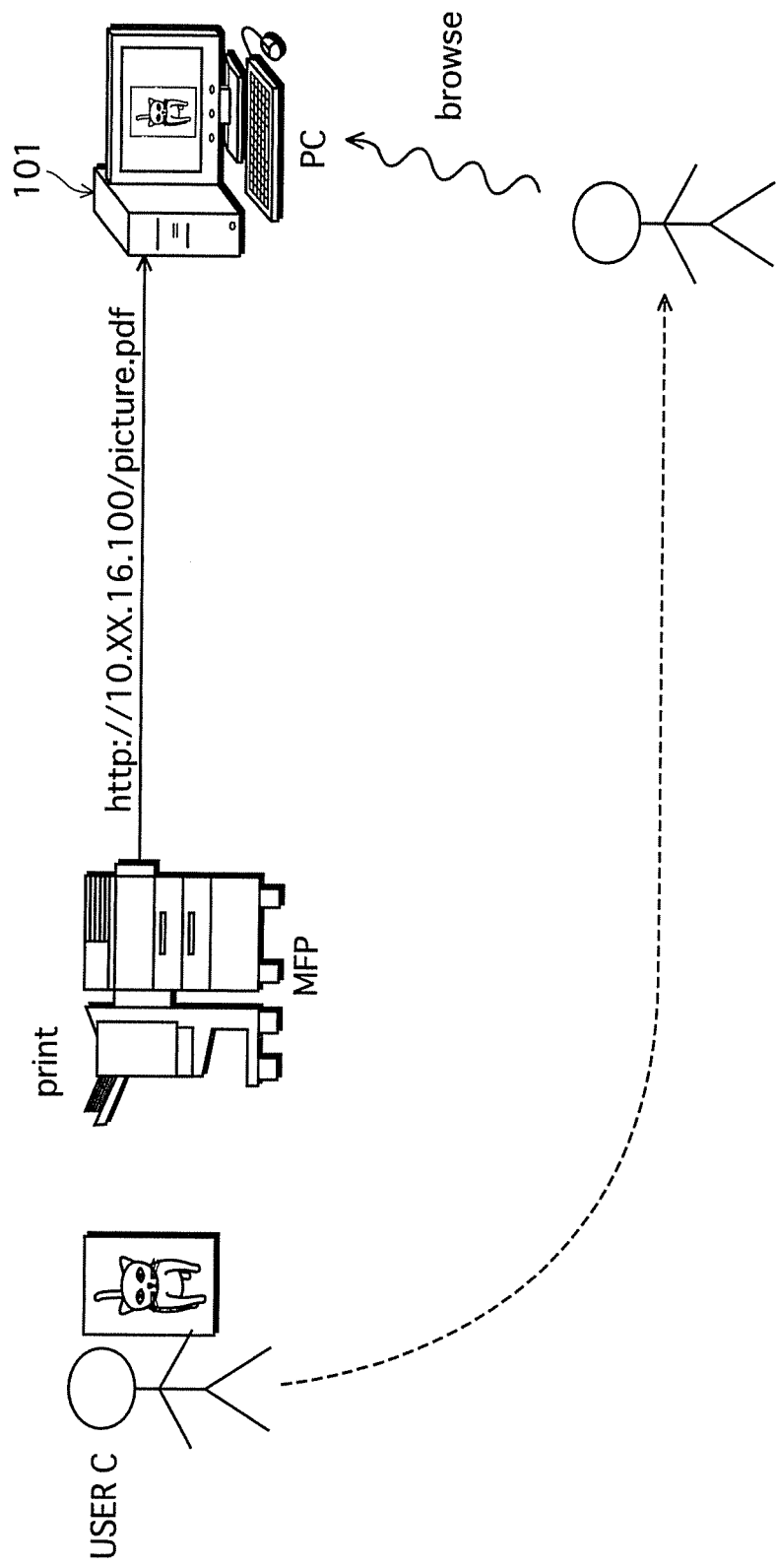
FIG. 9 shows an outline of a modification example 1 in which the structure of the first embodiment is partially modified.

As FIG. 9 shows, in the modification example 1, not all the URLs but URLs at which printing is executed by the Web browser of the MFP 3 are selectively stored as the items of the URL history, and notified to the PC 101.

Such URLs are important for the user and it is highly possible that the user accesses the URLs again with the Web browser of the PC 101. Therefore, by selectively storing such URLs and automatically notifying the PC 101 of the URLs, it is possible to enable the user to omit selecting an item of the history at the PC 101 as the notification destination.

Figure 10:
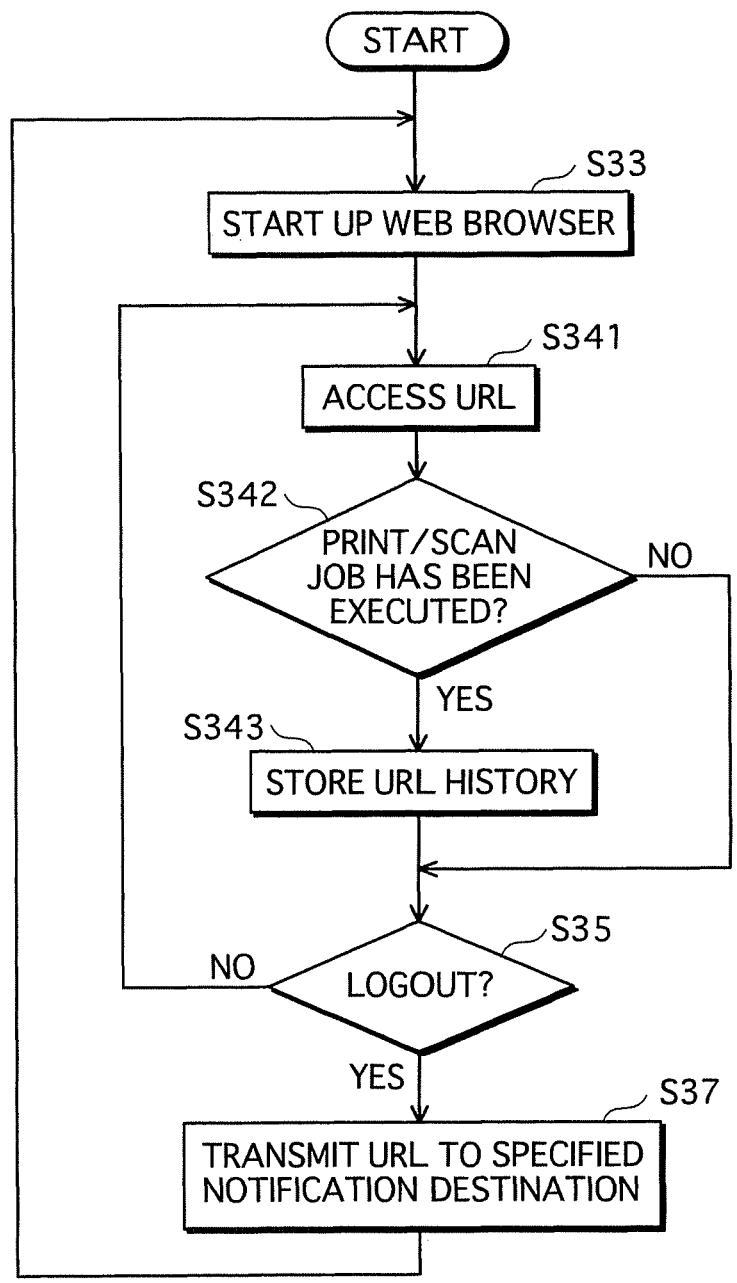
FIG. 10 is a flowchart showing processing for specifying a URL notification destination and notifying a URL according to the modification example 1.

Processing for storing and notifying (transmitting) items of the URL history is executed in accordance with the flowchart shown in FIG. 10. In the state where the Web browser has been started up (S33), if an access to a URL is occurred, and if the URL relates to a print job (or a scan job) (S341, S342: Yes), the URL is to be stored as an item of the URL history (S343). Since Steps S35 and S37 are the same as Steps S15 and S17 respectively (see FIG. 7), explanations thereof are omitted here.

Figure 11:
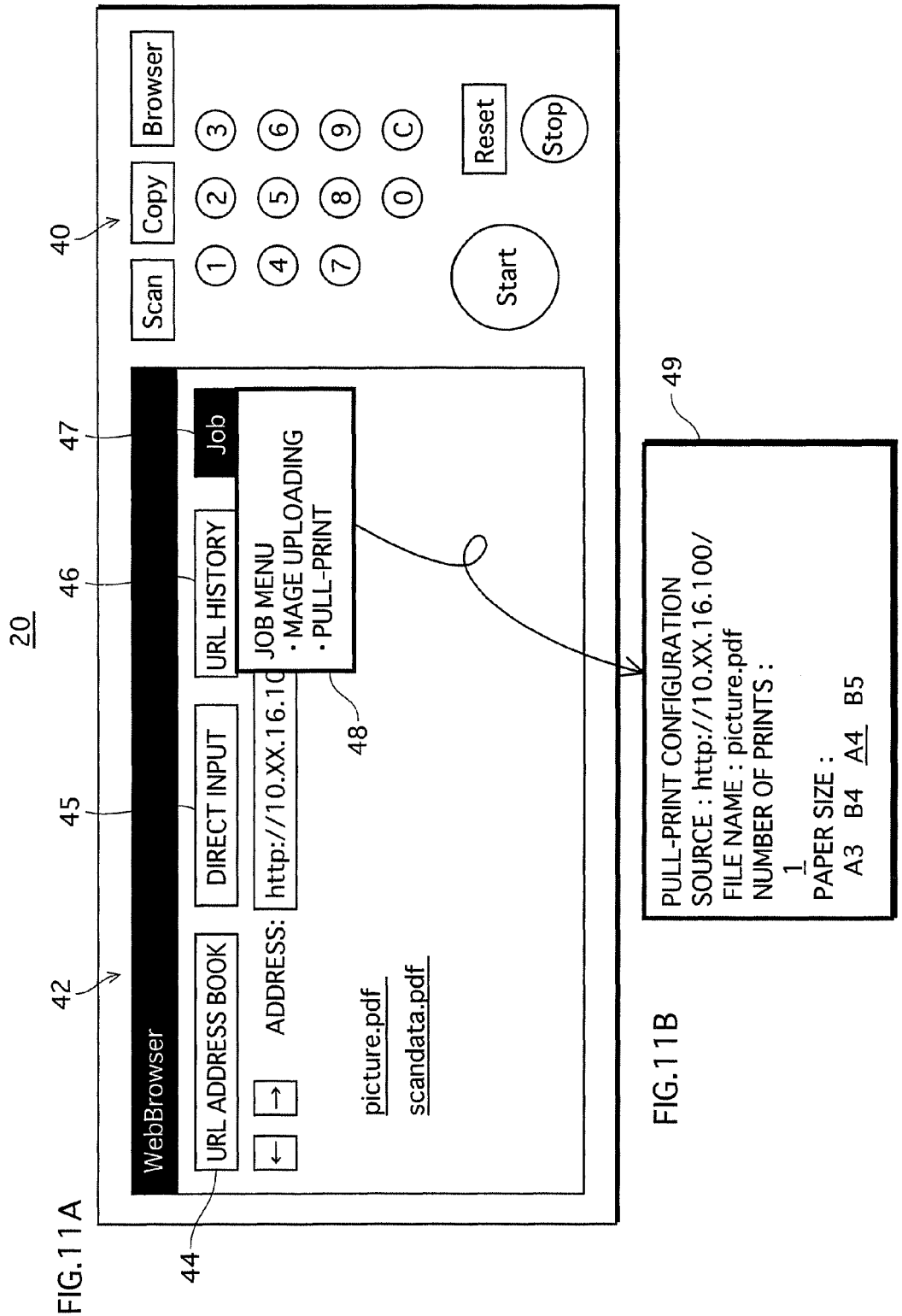
FIG. 11 shows an operation panel 20 of the MFP 3 at the time when Step S341 in FIG. 10 is performed.

As FIG. 11A shows, the operation panel unit 20 includes a push button group 40, and a touch panel 42. The push button group 40 includes numerical keys and keys such as a "Start" key, a "Reset" key, a "Scan" key, a "Copy" key, and a "Browser" key.

A Web browser screen is displayed within the touch panel 42.

At the top part of the Web browser screen, a "URL address book" key 44, a "direct input" key 45, a "URL history" key 46, and a "Job" key 47 are displayed. Among these keys, the "Job" key 47 that is highlighted is currently in the selected state.

If the "direct input" key 45 is selected, the screen shown within the touch panel changes to a virtual keyboard screen (not illustrated), which accepts manual inputs of URLs.

A "Job" menu 48 includes two items, namely "image uploading" and "pull-printing".

If the "pull-printing" is selected, a pull-printing menu 49 is displayed as shown in FIG. 11B.

The pull-printing menu 49 includes items for configuring the printing, namely a URL of a file as an extraction source, a file name, the number of prints, and a paper size.

In the case of the example shown in FIG. 11B, the URL "http://10.XX.16.100/picture.pdf" is notified to the notification destination.

Modification Example 2

Figure 12:
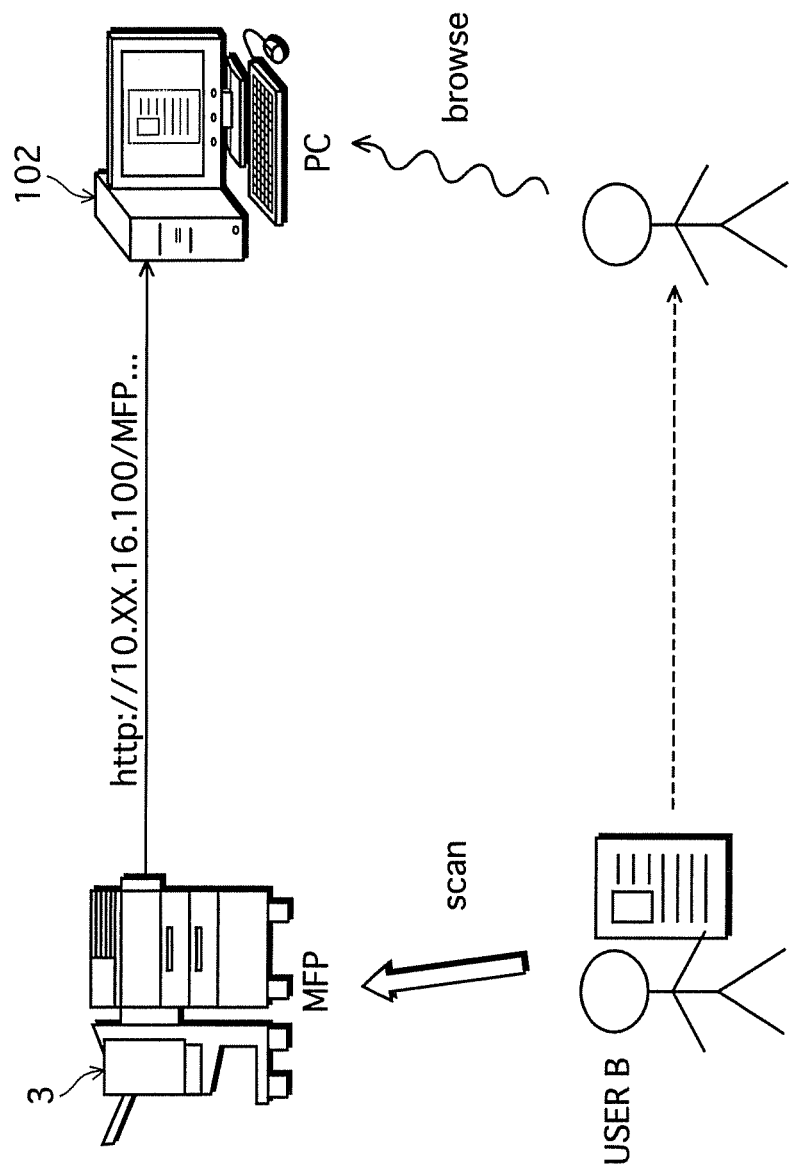
FIG. 12 shows an outline of a modification example 2 in which the structure of the first embodiment is partially modified.

In the modification example 2, an upload destination URL of image data created by scanning performed by the MFP 3 is notified to the PC 102 as FIG. 12 shows.

Figure 13:
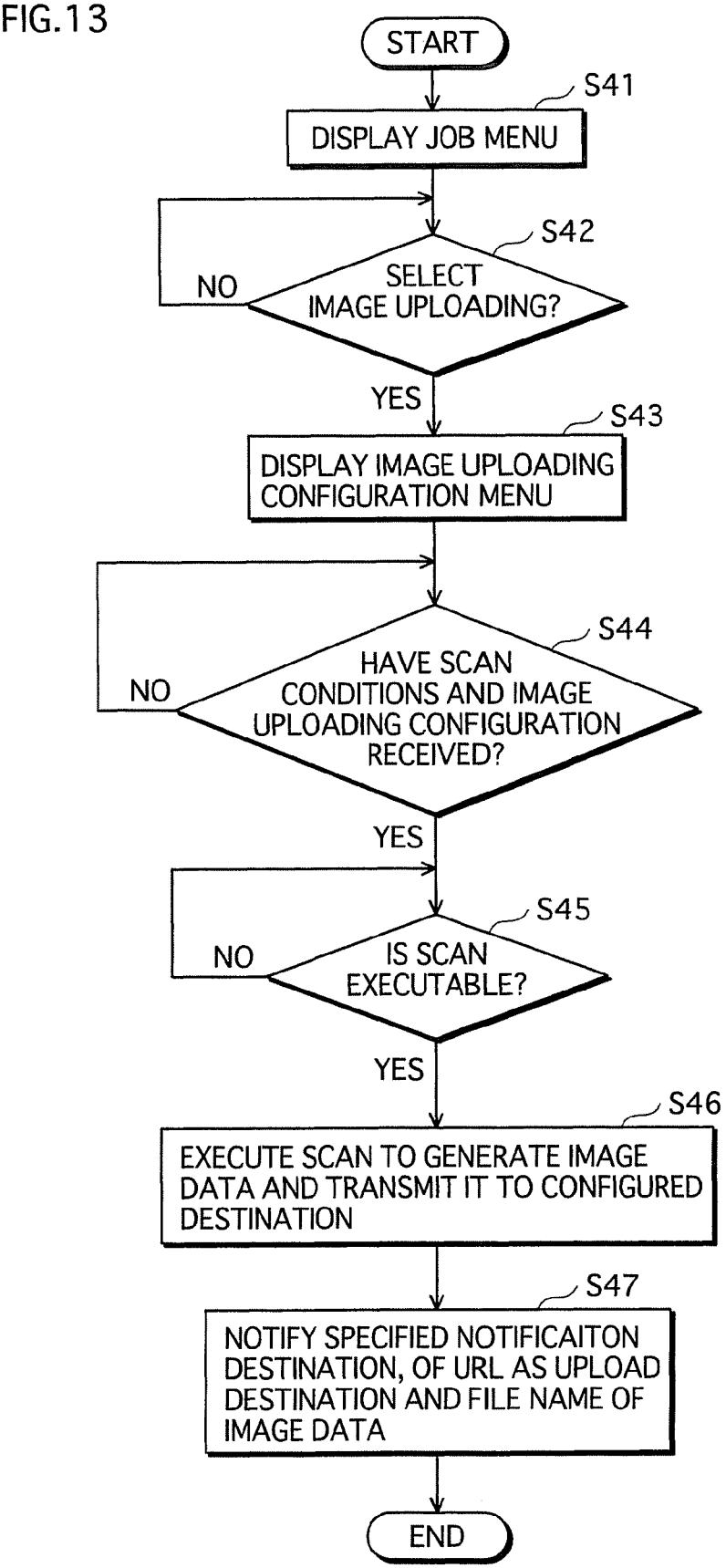
FIG. 13 is a flowchart showing processing performed by the control unit 10 of the MFP 3 for uploading an image and notifying a URL.

In other words, as FIG. 13 shows, the MFP 3 displays the "Job" menu 47 (see FIG. 11A) (S41), and if the image uploading is selected (S42: Yes), displays the image uploading menu (S43).

Figure 14A:
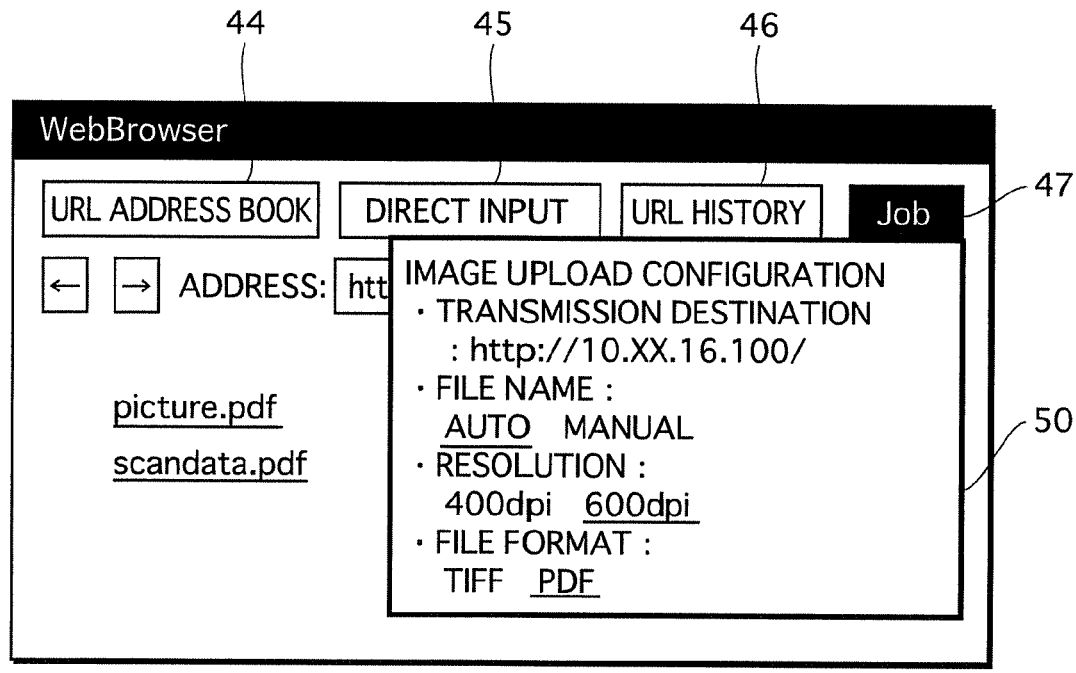
FIG. 14 shows a touch panel 42 of an MFP 3.

FIG. 14A shows the screen of the Web browser including the image uploading menu.

The image uploading menu 50 includes items such as "resolution" and "file type" (TIFF or PDF) as scanning conditions, and "transmission destination" and "file name" (automatic configuration or manual input) as image uploading conditions.

Upon receiving the scan conditions and the image uploading conditions (S44: Yes), if the scanning is executable (S45: Yes), the MFP 3 performs scanning to create image data, and transmits the image data to the upload destination (S46).

Figure 14B:
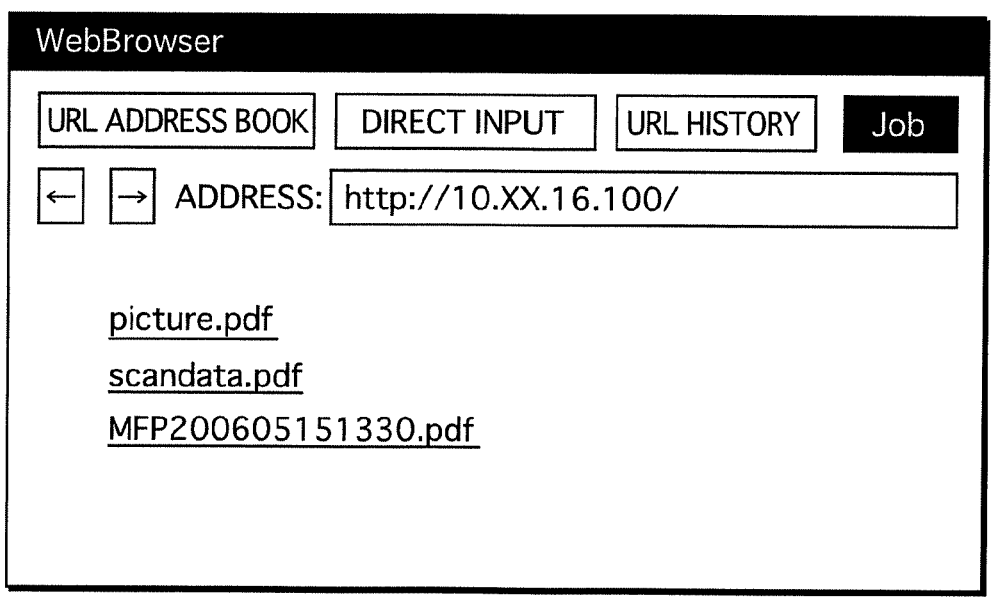

In the example shown in FIG. 14A and FIG. 14B, the resolution and the file type as the scanning conditions are set to be 600 dpi and PDF respectively, and the automatically given file name "MFP200605151330.pdf" and the transmission destination "http://10.XX.16.100/" are determined as the uploading conditions.

Next, the upload destination URL (e.g. "http://10.XX.16.100/MFP200605151330.pdf") and the file name of the image data (MFP200605151330.pdf) are transmitted to the specified notification destination (S47).

The URL to be notified in Step S47 is not an existing URL such as "http://Konicaminolta.jp" explained in the embodiment, but a sort of URL generated by the MFP 3.

If the URL is well known and open like the URL "http://Konicaminolta.jp" for example, the user can access the URL using a search engine for example, even though the user does not remember the URL.

On the other hand, since the URL created by the MFP in this modification example is a new and local URL, the URL is not known well.

According to this modification example, the user can easily access even such a URL by the Web browser of the PC that is the notification destination.

Also, in the same manner as the case of the uploading, the manually input URLs do not have high accessibility. Therefore, URLs whose "URL manual input" shown in FIG. 3A is "o" may be selectively notified.

In the example of FIGS. 14A and 14B, the IP address ("http://10.XX.16.100/") of the MFP 3 is determined as the upload destination. However, the upload destination can be arbitrarily determined. Other apparatuses (file servers) may be selected as the upload destination.

The Second Embodiment

In the first embodiment, the URL history is transmitted by the MFP to the PC as the notification destination (MFP push type).

On the contrary, in the second embodiment, the PC retrieves the URL history from the MFP (PC pull type).

The functional structures of the MFP and the PC of the second embodiment are the same as those explained with reference to FIG. 1 to FIG. 5. Therefore, explanations thereof are omitted here.

In the second embodiment, operations of the MFP 3 and the PC 101 are explained below based on an example case where a user A uses the Web browser of the MFP 3 and then uses the Web browser of the PC 101 later to access a Web page provided by the MFP 3.

Figure 15:
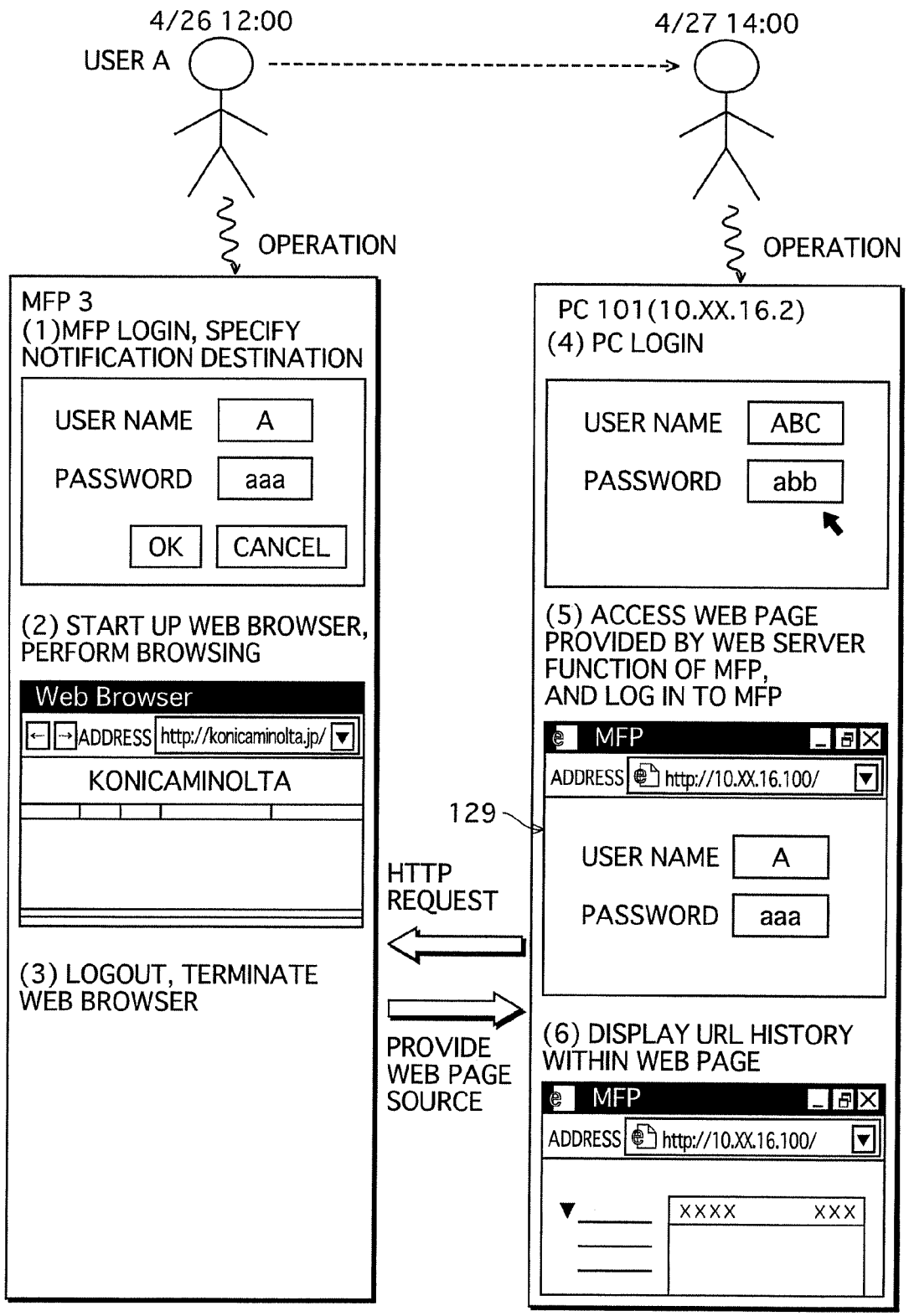
FIG. 15 shows transitions of display screens of an MFP and a PC according to the second embodiment.

As FIG. 15 shows, the operations of the MFP 3 and the PC 101 can be summarized as follow.

(1) The MFP 3 accepts login of the user A, and specifies the URL history notification destination based on the login user name.

(2) The user starts up the Web browser, and the MFP 3 performs browsing in response to operations input by the user A.

(3) The user logs out and terminates the Web browser.

(4) The PC 101 accepts login of the user A.

(5) The user accesses a Web page provided by the Web server unit 26 using the Web browser 112 of the PC 101, and logs in to the MFP 3 through an authentication screen 129.

(6) The PC 101 transmits a URL history display request to the MFP 3, and shows URL history received from the MFP 3 within a Web page displayed by the Web browser 112.

Figure 16:
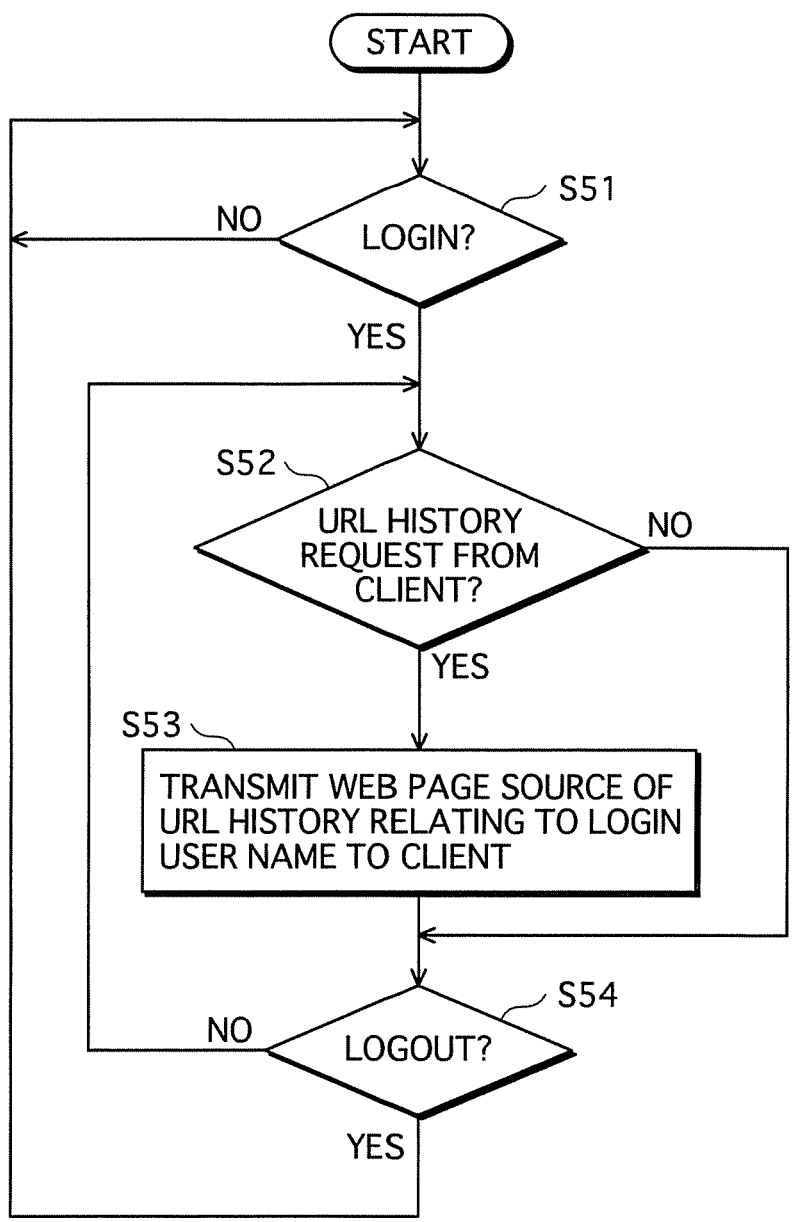
FIG. 16 shows processing performed by a Web server unit 2 of the MFP 3 for authentication and for providing a URL history.

As FIG. 16 shows, in Step S51, the MFP 3 transmits an authentication request to the PC 101 (10.XX.16.2) that has issued an HTTP request, by providing the PC 101 with a Web page source including the authentication screen 129. Then, the MFP 3 accepts login of the user A, based on a pair of the user name and the password. In the example shown in FIG. 15, the user A is authenticated based on the pair of the user name "A" and the password "aaa".

If the MFP 3 receives the URL history request from the PC 101 as a client (S52), the MFP 3 extracts the URL history relating to the login user name from the URL history table 33, and transmits a Web page source of the URL history to the PC 101 (S53).

As described above, only items of the URL history that relate to the login user name are transmitted to the client. This is because that if URLs not relating to the login user name are included in the URL history, it is highly possible that such URLs are not used at the terminal device that has received the history. In addition, problems of privacy and security might occur.

Then, if the user logs out (S54), Step S51 is performed again. The MFP 3 may accept the logout of the user by displaying a logout screen or judge the logout based on a predetermined elapse time from the login.

Figure 17A:
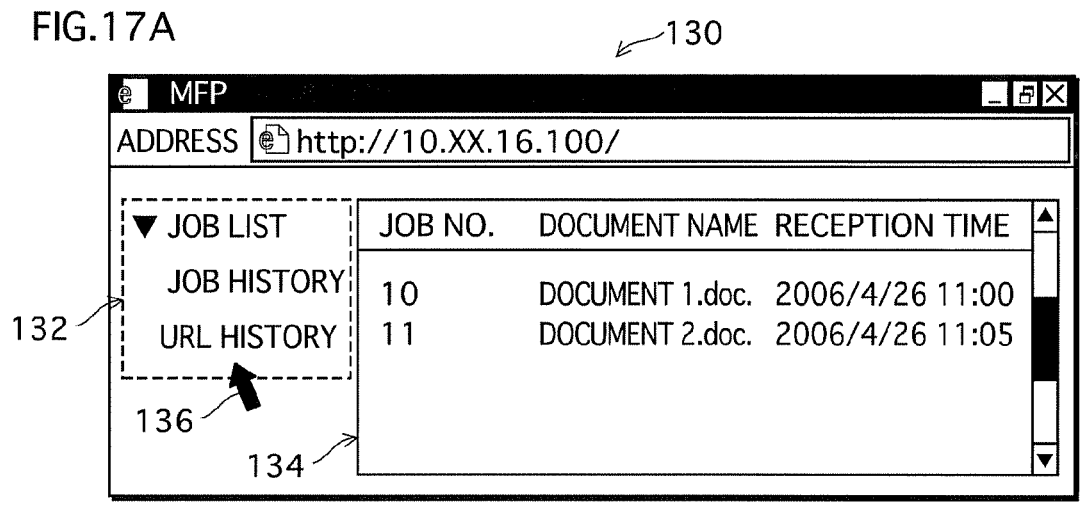
FIG. 17A shows a Web browser window 130 of the PC 101 corresponding to Step S51.

As FIG. 17A shows, a menu including "job list" (a list of active jobs), "job history" (a list of executed jobs) and "URL history" are displayed in a left frame 132 at the left part of the Web browser window 130, and the "job list" is currently in the selected status as shown by the black triangle sign.

In a right frame 134 at the right part of the Web browser window 130, a list of active jobs corresponding to the "job list" is displayed.

Figure 17B:
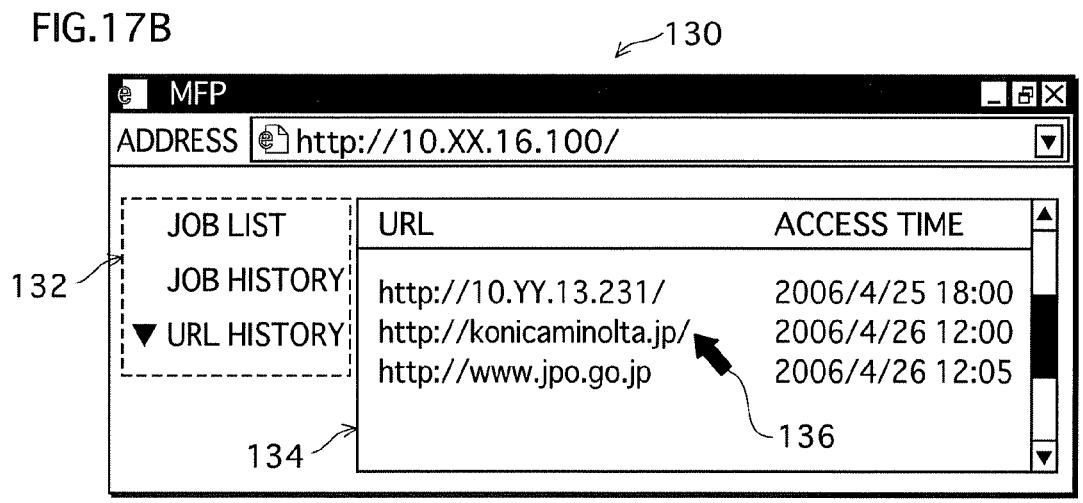
FIG. 17B shows the Web browser window 130 of the PC 101 corresponding to Step S52.

If the "URL history" menu in the left frame 132 is selected with a mouse cursor 136, the screen shown in the right frame 134 is switched as FIG. 17B shows, and a list of URLs are displayed together with access times.

Figure 17C:
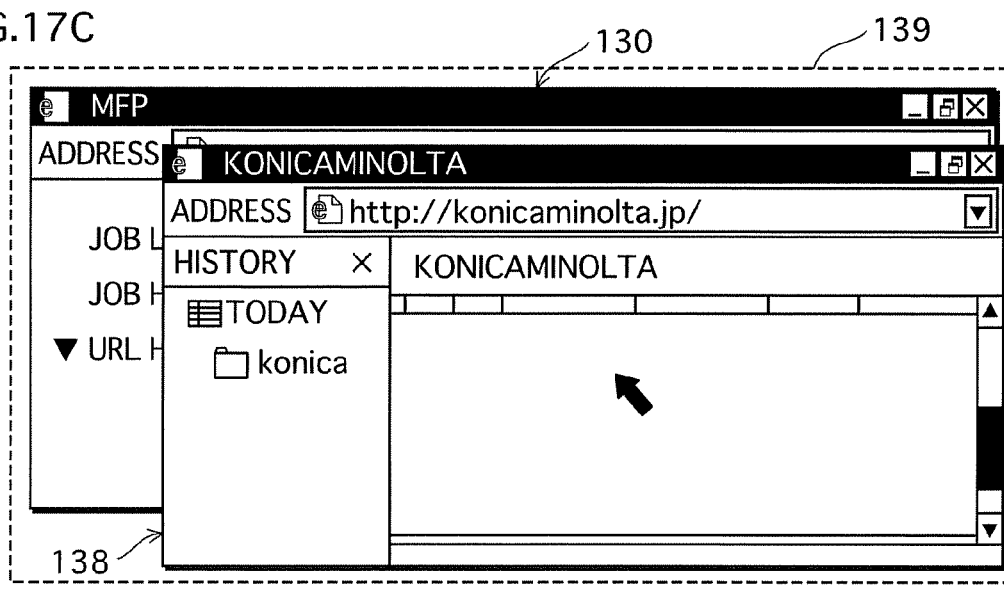
FIG. 17C shows a desktop screen 139 of the PC 101 corresponding to Step S52.

If the URL "http://Konicaminolta.jp" displayed in the right frame 134 is selected, a new window 138 of the Web browser designating the selected address is started up as FIG. 17C shows.

As described above, according to the second embodiment, the user A can use the URL history of the Web browser of the MFP 3 by designating the URL on the Web browser 112 of the PC 101. This improves usability.

Moreover, the second embodiment can realize an environment that enables the user to use really necessary items of the URL history through an interactive user interface at an arbitrary terminal apparatus that can access the Web server (MFP 3).

The Third Embodiment

The first and second embodiments each have the structure in which the URL information relating to the Web browser of the MFP can be used by the Web browser of the PC. To the contrary, the third and forth embodiments have a structure in which the URL information relating to the Web browser of the PC can be used by the Web browser of the MFP.

The third embodiment explains an example structure where the MFP retrieves the URL history from the PC (MFP pull type), and the fourth embodiment explains an example structure where the PC transmits the URL history to the MFP (PC push type).

The functional structures of the MFP and the PC according to the third embodiment are the same as those explained with reference to FIG. 1 to FIG. 5. Therefore, explanations thereof are omitted here.

Figure 18:
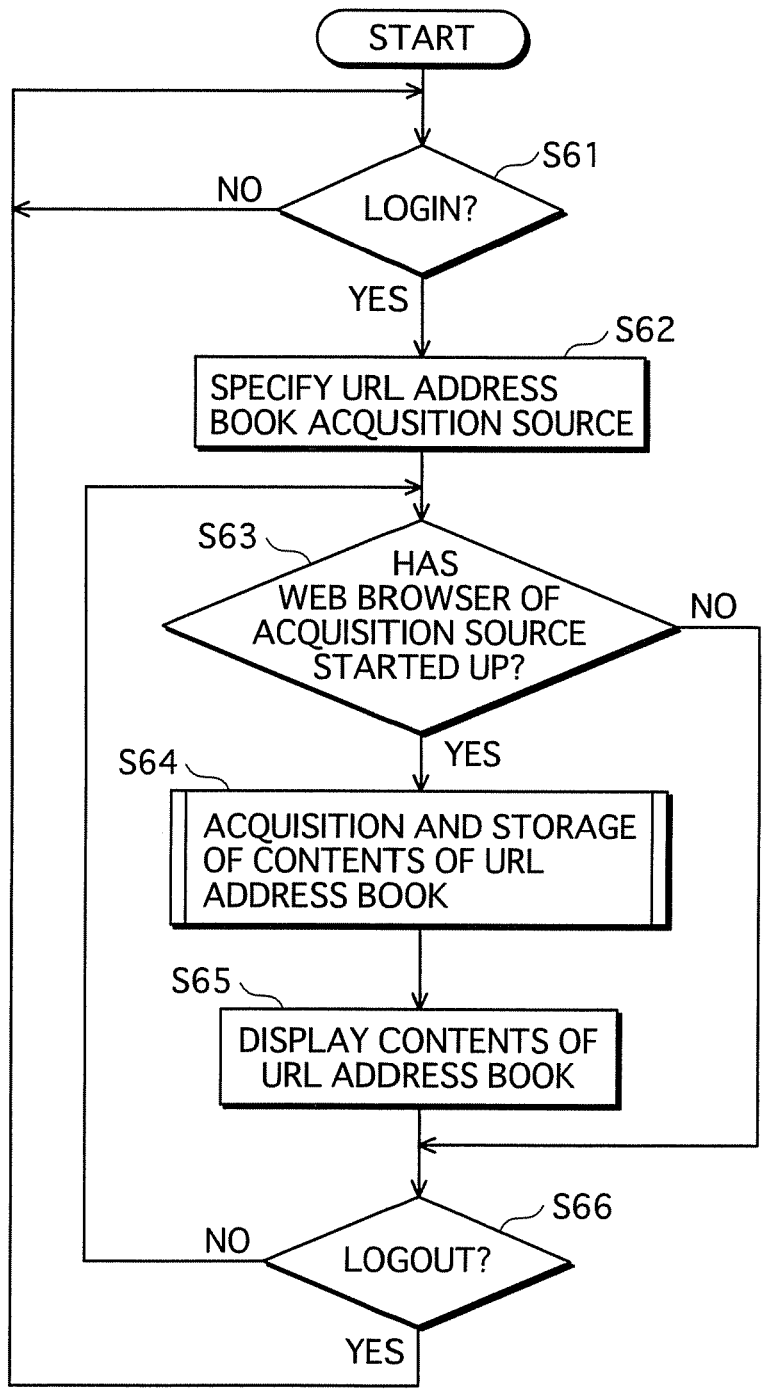
FIG. 18 is a flowchart showing processing performed by the control unit 10 of the MFP 3 for specifying a URL acquisition source and acquiring a URL.

The control unit 10 of the MFP 3 performs the following processing. As FIG. 18 shows, upon receiving the login of the user A via the input keys on the operation panel unit 20 (S61), the control unit 10 refers to the user management table 37 to specify the URL address book acquisition source corresponding to the authenticated user name (S62).

For example, the URL address book acquisition source of the user name "B" is indicated by the directory path "D:/Program Files . . . " under the PC located at the IP address "10.XX.16.3".

Figure 19:
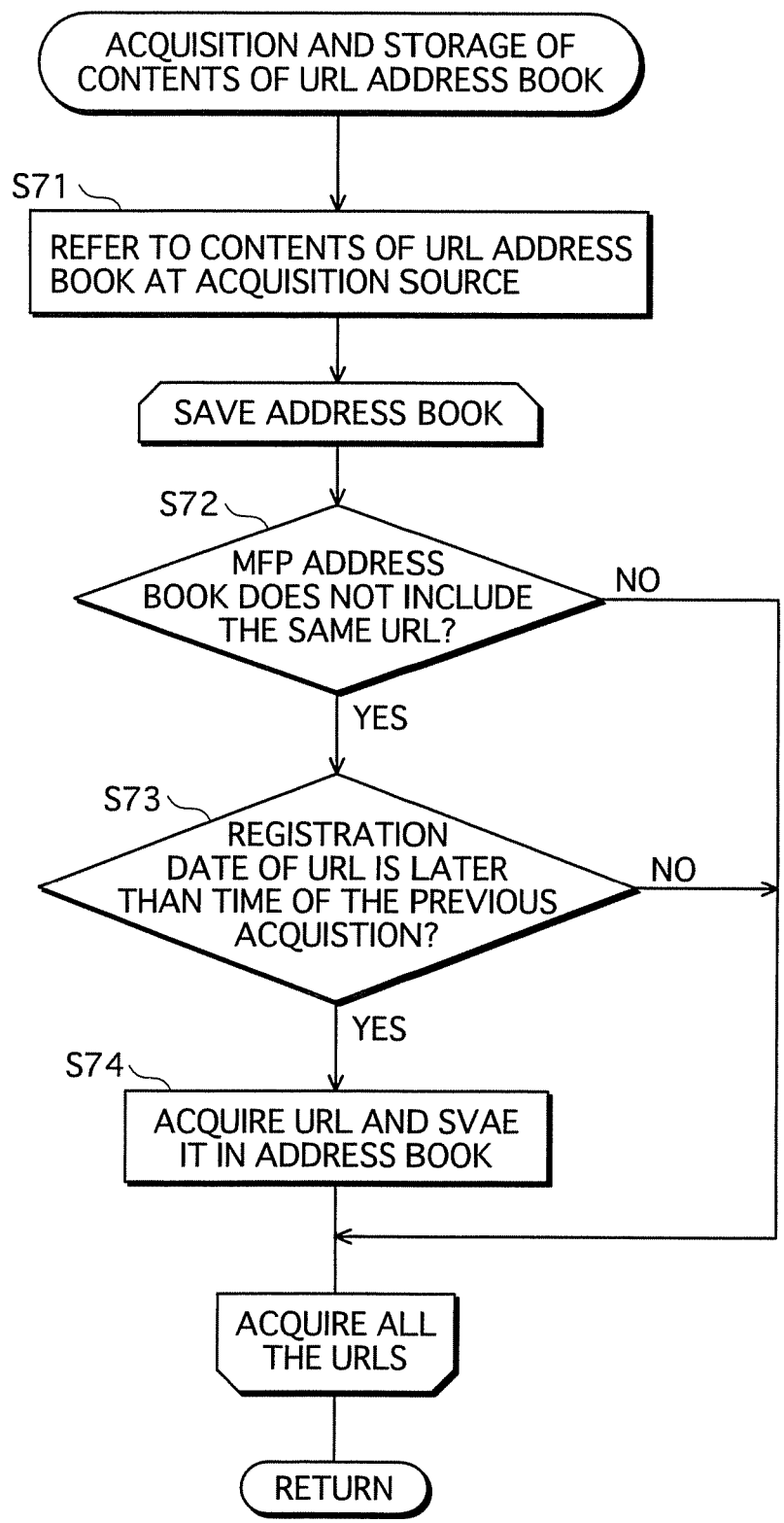
FIG. 19 is a flowchart showing a subroutine for acquiring and storing the contents of the URL address book.

If the Web browser of the PC has been started up (S63: Yes), Step S64 as a subroutine shown in FIG. 19 is performed.

In this subroutine, the MFP 3 firstly refers to the contents of the URL address book at the acquisition source (S71).

If the address book of the MFP does not include any URL included in the URL address book at the acquisition source, and the URL registration date of the URL is later than the time of the previous acquisition, the MFP 3 acquires the URL and saves the URL in the address book (S72: Yes, S73: Yes, S74). These Steps are performed for avoid duplicate or unnecessary registrations of URLs.

Steps S72 to S74 are repeated for every URL. For example, in the case where the URL address book acquisition source is indicated by a directory path "D:/Program Files . . . ", Steps S72 to S74 are repeated as to each of the files that includes URL information and located under the directory path "D:/Program Files . . . ".

Then, the main routine is performed to make it possible to display the acquired contents of the URL address book until the user logs out (S65, S66: Yes).

Figure 20:
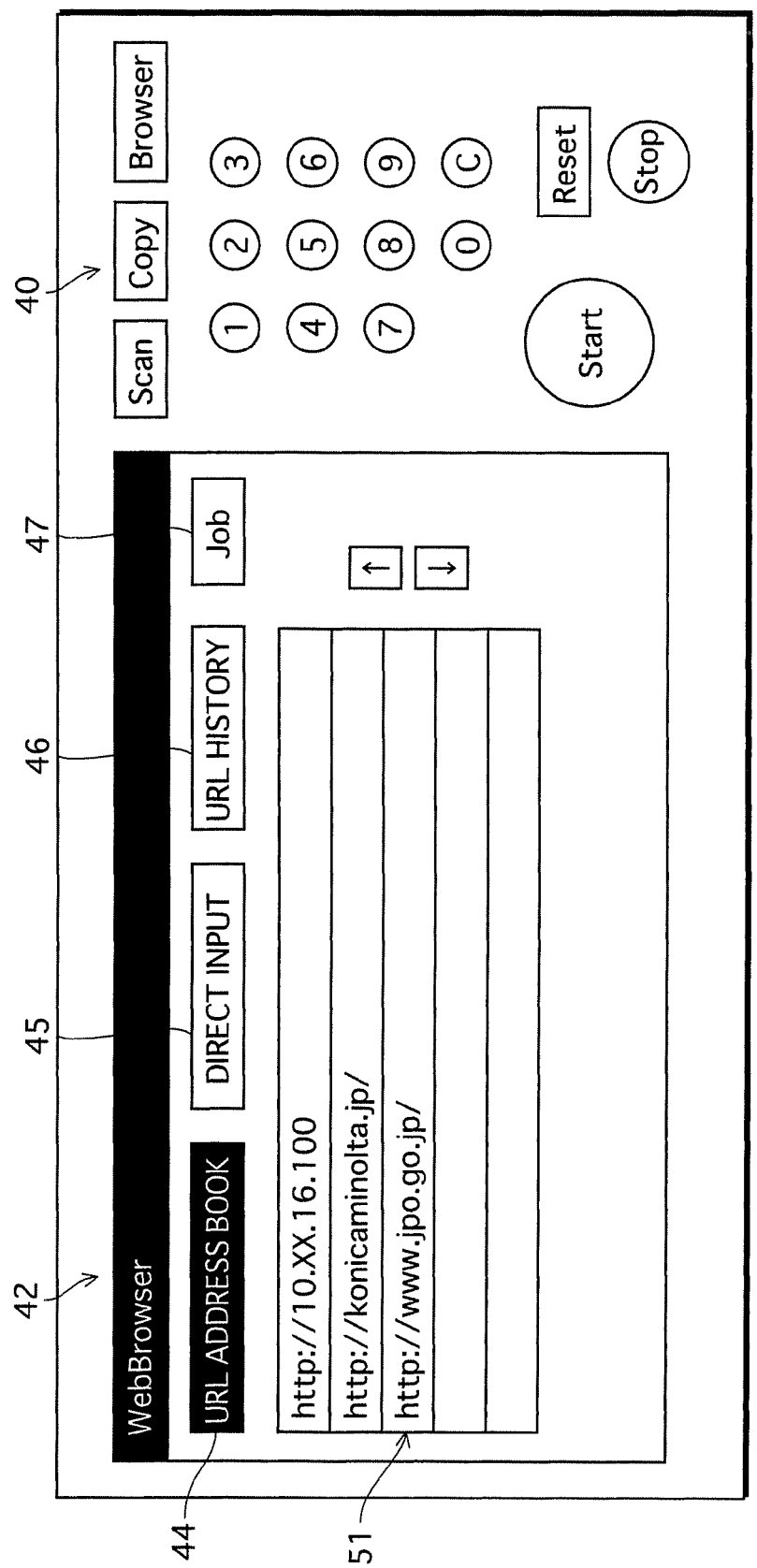
FIG. 20 shows the operation panel 20 of the MFP 3 at the time when Step S65 is performed.

In the Web browser screen shown in the touch panel 42, the "URL address book" key 44 is in the selected state as FIG. 20 shows. In a frame 51 in the center of the screen, URLs included in the URL address book are displayed in the form of a list.

Figure 21:
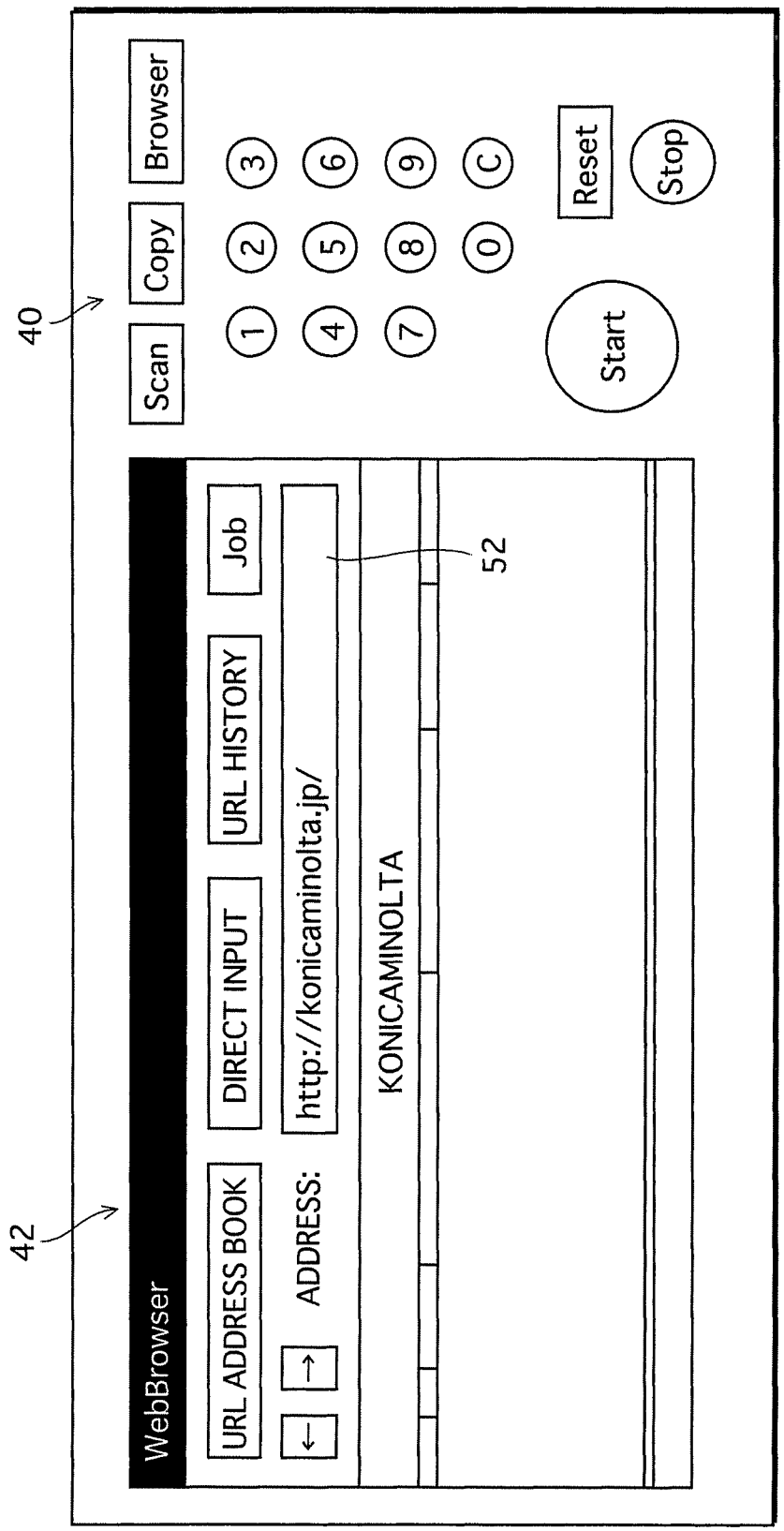
FIG. 21 shows the operation panel 20 of the MFP 3.

If the user selects a URL "http://Konicaminolta.jp" included in the list, the user can access the URL as shown in FIG. 21. An address field 52 shows the URL "http://Konicaminolta.jp".

According to this embodiment, the user can use the URL address book registered by the Web browser of the PC as the URL address book for the Web browser of the MFP. As a result, the user is freed from the trouble of re-registering the URL address book again, and the operability of the Web browser of the MFP is improved.

The Fourth Embodiment

The MFP according to the fourth embodiment has the same functional structure as that explained with reference to FIG. 1 to FIG. 4. Therefore, the explanation thereof is omitted here. The structure of a PC according to the fourth embodiment is partially different from that explained with reference to FIG. 5. Therefore, the difference is mainly explained below.

Figure 22:
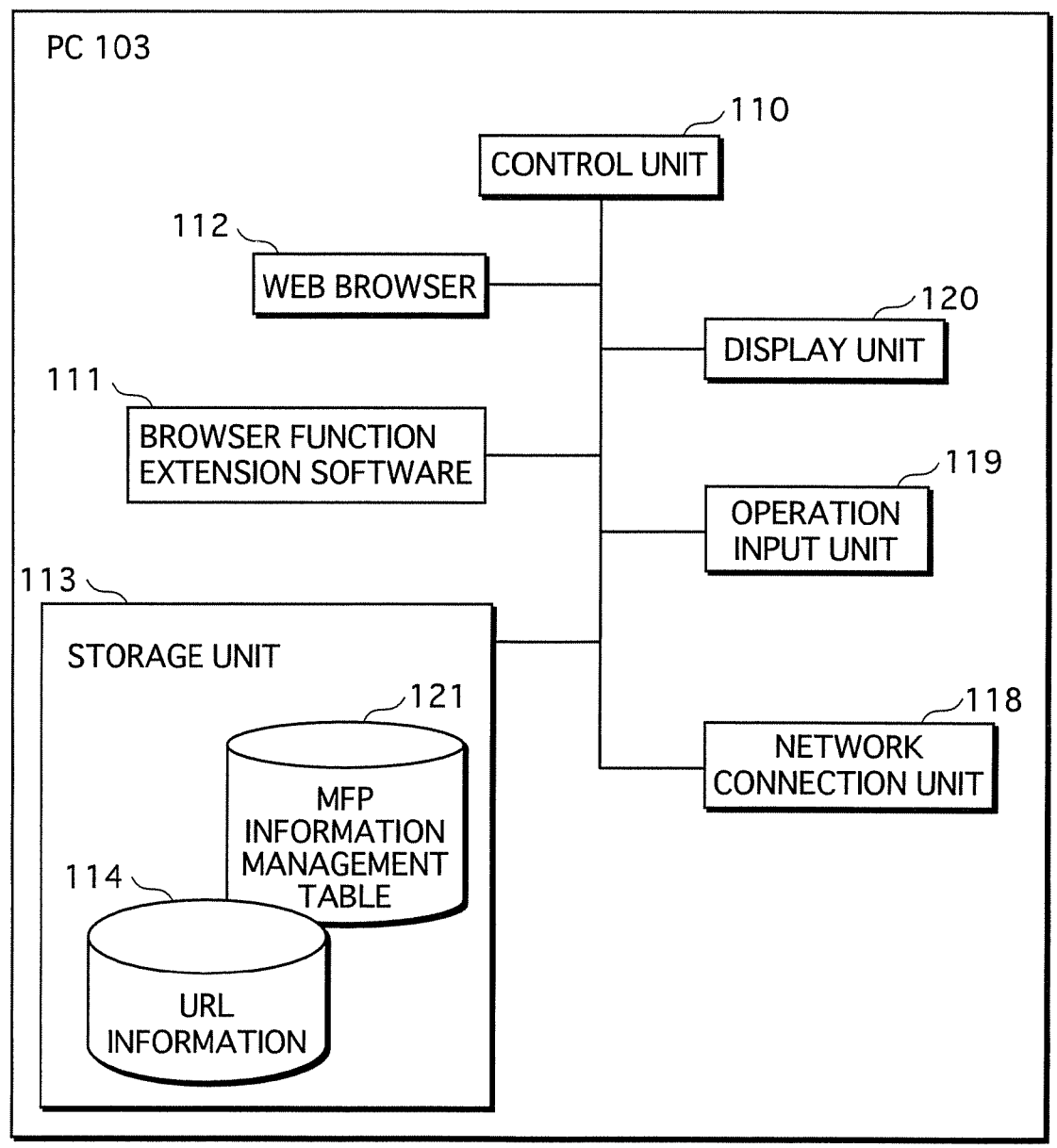
FIG. 22 is a functional block diagram showing the structure of PC 103.

As FIG. 22 shows, a PC 103 includes browser function extension software 111 and a storage unit 113.

The browser function extension software 111 is software for extending the function of the Web browser 112. Such a function is also called as a "plug-in", an "add-on" or an "extension". Functions to be extended are specifically described later with reference to a flowchart shown in FIG. 24.

The storage unit 113 includes URL information 114 and a MFP information management table 121.

As FIG. 23 shows, the MFP management table 121 includes two major items, namely "PC login information" and "notification-destination MFP information".

The PC login information is constituted of a pair of "user name" and "password", which are information required for logging in to the PC.

The "notification-destination MFP information" includes items namely "IP address", "login user name for MFP", and "password".

Figure 24:
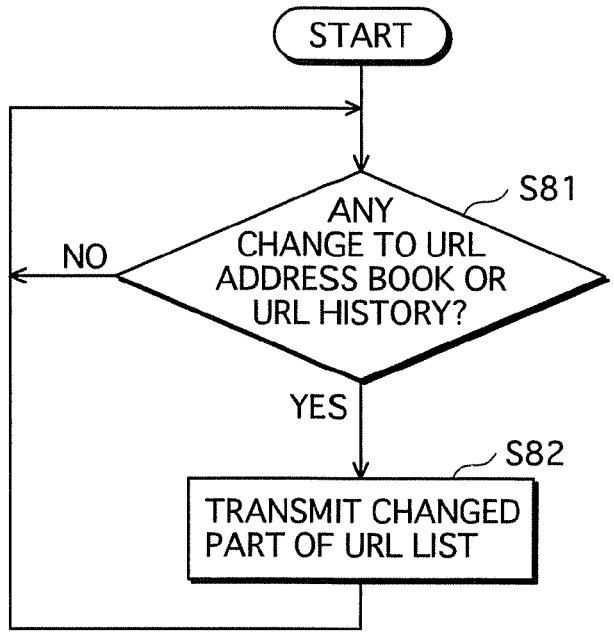
FIG. 24 is a flowchart showing processing performed by the Web browser 112 for monitoring and notifying the URL address book and the URL history.

The Web browser 112 having functions extended by the browser function extension software 111 performs processing shown in FIG. 24.

If the Web browser 112 detects any change to the URL address book and the URL history of the Web browser such as an addition of a new URL list (S81: Yes), (1) the changed part of the URL list and (2) the URL information including the login user name for MFP and the password are transmitted to the notification destination MFP (S82).

Figure 25:
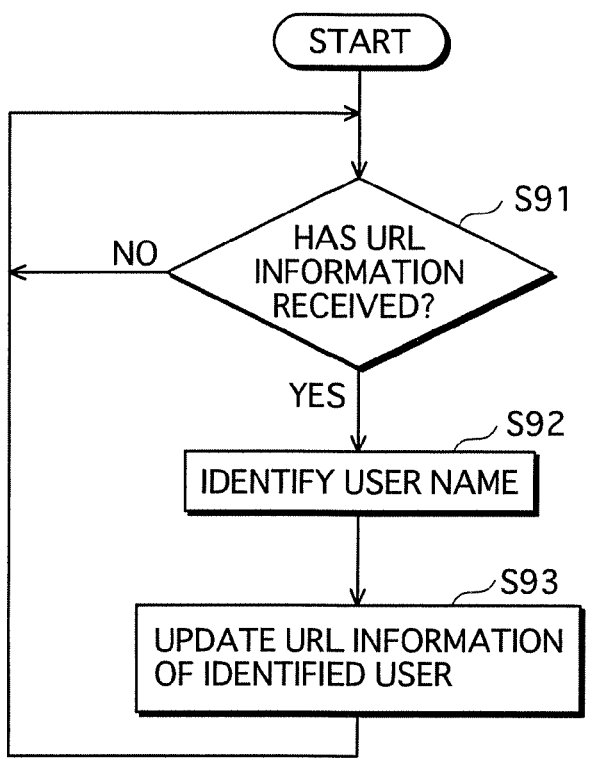
FIG. 25 shows processing performed by the control unit 10 of the MFP 3 that has received the URL information.

Meanwhile, upon receiving the URL information as shown in FIG. 25 (S91), the control unit 10 of the MFP 3 identifies the user based on the user name included in the URL information (S92).

Then, the control unit 10 updates and saves the URL information relating to the identified user.

Other Explanations (1) In each of the embodiments, the user of the PC or the MFP is authenticated. However, even if such an authentication is not performed (even if a check of the user authority is not performed), the present invention can be implemented as long as the user name can be identified.

(2) The image processing apparatus of the present embodiment can be adapted as an information transmission method (Web browser configuration supporting method) for transmitting information to a Web server, and furthermore adapted as a program that realizes the method on a computer. Such a program may be recorded on various computer-readable recording media, for example:magnetic tapes; magnetic disks such as flexible disks; optical disks such as DVDs, CD-ROMs, CD-Rs, MOs and PDs; and flash memory-type recording media such as Smart Media™). Thus, the present invention may be produced and transferred in the form of recording media, or may be the program to be transmitted and supplied via networks, as represented by wire/wireless communications including the Internet, or via broadcasting, a telecommunication circuit and satellite communications.

In addition, the above program does not have to include all modules that are required to cause a computer to execute the above-mentioned processes. For example, it is possible to cause a computer to execute each process described in the present embodiment by using versatile programs—e.g. communications programs and programs included in an operating system (OS)—installable on a different information processing apparatus. Accordingly, the above-mentioned recording media do not necessarily record thereon all the modules described above, and all the modules do not always have to be transmitted. Furthermore, predetermined processes may be executed using special hardware.

Summary of Embodiments (1) One of the embodiments contemplates an image processing apparatus connectable to a terminal apparatus via a network, comprising: a Web browser operable to perform browsing in response to operations by users; a URL manager operable to manage pieces of URL information each including a list of URLs accessed by one of the users using the Web browser and a user name of the one of the users; a user terminal manager operable to manage notification destination information including user names of the users and locations of terminal apparatuses respectively corresponding to the user names; an extractor operable to extract a piece of the URL information that relates to a given one of the user names; and a transmitter operable to transmit the extracted piece of the URL information to one of the locations that corresponds to the given one of the user names indicated by the notification destination information.

Note that the "user name" above is not limited to a "name of a person". Any information may be used as the "user name" as long as it can be used for identifying the user.

Also, the "user" is not limited to a natural person.

Moreover, the "location" may be replaced with any information as long as it can identify the transmission destination.

(2) In the structure of (1), the notification destination information may further include directory paths respectively corresponding to the terminal apparatuses, each directory path indicating a location of a URL history of a Web browser belonging to one of the terminal apparatuses that corresponds to the directory path, the extractor may extract a list of URLs relating to the given one of the user names from the URL information, and the transmitter may transmit the extracted list to one of the directory paths that corresponds to the given one of the user names indicated by the notification destination information.

With the stated structure, the user can easily use the list of the URLs as the URL history of the Web browser of the terminal apparatus.

(3) In the structure of (1), each piece of the URL information may further include a list of URLs registered with the Web browser by one of the users and a user name of the one of the users that has registered the URLs.

With the stated structure, with the Web browser of the terminal apparatus, the user can easily use the URL list that the user has registered before in the Web browser of the image processing apparatus. It is anticipated that the registered URL list is preferred by the user and frequently accessed by the user. The user can easily access such URLs with the Web browser of the terminal apparatus.

(4) In the structure of (3), the notification destination information may further include directory paths respectively corresponding to the terminal apparatuses, each directory path indicating a location of a URL address book of a Web browser belonging to one of the terminal apparatuses that corresponds to the URL address book, the extractor may extract a list of the registered URLs relating to the given one of the user names from the URL information, and the transmitter may transmit the extracted list to one of the directory paths that corresponds to the given one of the user names indicated by the notification destination information.

With the stated structure, the user can easily use the list of the URLs as the URL address book for the Web browser of the terminal apparatus.

(5) In the structure of (1), when one of the users ends the browsing or logs out, the extractor may extract a list of URLs that relates to the one of the users, and the transmitter may start transmission of the extracted list.

With the stated structure, after accessing a URL using the Web browser of the image processing apparatus, a user can access the same URL using the Web browser of a terminal apparatus of the user.

(6) In the structure of (1), each piece of the URL information may further include access date and time that correspond to the list of the URLs, when one of the users logs out, the extractor may extract a list of URLs that corresponds to access time and date included in a final login period of the one of the users from the URL information, and the transmitter may start transmission of the extracted list.

With the stated structure, with the terminal apparatus that has received the URL information, the user can more easily access the URLs that the user has accessed immediately before.

(7) In the structure of (1), in the URL information, each URL included in the list of the URLs may have operation information indicating whether any of specific operations, including a print instruction, a transmission instruction and a download instruction, has been performed with respect to the URL, and the extractor may extract a list of URLs whose operation information indicates that any of the specific operations has been performed.

With the stated structure, with the Web browser of the terminal apparatus, the user can access the URL at which any of the specific operations has been performed. Such a URL is important and highly possibly accessed by the user again.

(8) In the structure of (1), the image processing apparatus may further comprise an input part, wherein the Web browser may have a function of receiving a manual input of a URL via the input part, in the URL information, each URL included in the list of the URLs may have operation information indicating whether the URL has been manually input, and the extractor may extract a list of URLs whose operation information indicates that the URL has been manually input.

With the stated structure, it is possible to avoid that with the Web browser of the terminal apparatus, the user needs to manually re-input the URL that the user has input before with the Web browser of the image processing apparatus. This improves the operability for the user. This means that the user is free from re-inputting of a long character string, which requires a long time.

(9) In the structure of (1), the image processing apparatus may further comprise a scanner operable to scan a document to generate image data; and an uploader operable to upload the generated image data to an upload destination, wherein in the URL information, each URL included in the list of the URLs may have operation information indicating whether upload has been performed with respect to the URL, and the extractor may extract a list of URLs whose operation information indicates that upload has been performed.

With the stated structure, even if a URL has been just generated at the uploading (i.e. newly generated) and also is local (i.e. difficult to find by searches), the user can use the URL with the Web browser of the terminal apparatus.

(10) In the structure of (1), the image processing apparatus may further comprise: an operation panel including a display subpart and an input subpart; and a menu part operable to display a menu on the display subpart to inquire whether to transmit the URL information, and receive a response to the inquiry via the input subpart, wherein the transmitter may transmit the URL information only if the response to the inquiry is affirmative.

With the stated structure, it is possible to reflect the user's intention as to the transmission of the URL information.

(11) Another one of the embodiments contemplates an image processing system including an image processing apparatus and a terminal apparatus connected thereto via a network, the image processing apparatus comprising: a Web browser operable to perform browsing in response to operations by users; a URL manager operable to manage pieces of URL information each including a list of URLs accessed by one of the users using the Web browser and a user name of the one of the users; a user terminal manager operable to manage notification destination information including user names of the users and locations of terminal apparatuses respectively corresponding to the user names; an extractor operable to extract a piece of the URL information that relates to a given one of the user names; and a transmitter operable to transmit the extracted piece of the URL information to one of the locations that corresponds to the given one of the user names indicated by the notification destination information.

In this structure, in the URL information, each URL included in the list of the URLs may have operation information indicating whether any of specific operations, including a print instruction, a transmission instruction and a download instruction, has been performed with respect to the URL, and the terminal apparatus may comprise: a Web browser operable to perform browsing in response to operations by the users; a history directory operable to store a list of URLs accessed by one of the users using the Web browser; a registration directory operable to store a list of URLs registered with the Web browser by one of the users; a receiver operable to receive the piece of the URL information transmitted by the transmitter of the image processing apparatus; a judgment part operable to judge whether any of the specific operations has been performed with respect to each URL; and a save controller operable to save a list of URLs affirmatively judged by the judgment part into the registration directory, and to save a list of URLs negatively judged by the judgment part into the history directory.

With the stated structure, it is possible to simply display the list of the URL at which any of the specific operations has been performed, which is highly possibly re-used, in the Web browser of the terminal apparatus.

In other words, generally, in the user interface of Web browsers, a list of registered URLs is more often used by the user compared to the URL history, because the registered URLs are displayed in a manner easy to use. The number of items included in the URL history as a list of URLs that the user has accessed is much larger than that of the registered URLs, and such URL history tends not to be frequently used by the user. The stated structure can distinguishes the URLs included in the URL history from the registered URLs.

(12) Another one of the embodiments contemplates an image processing apparatus connectable to a terminal apparatus via a network, comprising: a Web browser operable to perform browsing in response to operations by users; a URL storing part operable to store pieces of URL information each including a list of URLs accessed by one of the users using the Web browser and a user name of the one of the users that has accessed the URLs; and a provider operable to specify a user name of one of the users that uses a terminal apparatus from which a provision request has been transmitted, extract a piece of the URL information that relates to the specified user name, and provide the terminal apparatus with the extracted piece of the URL information.

In this structure, the provider may receive the provision request via a Web browser of the terminal apparatus, and provide the terminal apparatus with a Web page source including the extracted piece of the URL information.

With the stated structure, it is possible to provide the terminal device with the URL information when the Web browser of the terminal apparatus is started up.

(13) Another one of the embodiments contemplates an image processing apparatus connectable to a terminal apparatus having a first Web browser via a network, the image processing apparatus comprising: a second Web browser operable to perform browsing in response to operations by users; a user terminal manager operable to manage acquisition source information including user names of the users and locations of terminal apparatuses respectively corresponding to the user names; an identifier operable to identify a user name of one of the users that uses the second Web browser; and an acquisition part operable to acquire a piece of URL information including a list of URLs accessed by the one of the users using the first Web browser, from one of the locations that corresponds to the user name.

In this structure, the second Web browser may read the list of the URLs included in the acquired piece of the URL information, and display the list in a browser window thereof.

With the stated structure, using the second browser, the user can easily access a desired URL that the user has accessed before with the first Web browser.

(14) Another one of the embodiments contemplates an image processing system including an image processing apparatus and a terminal apparatus connected thereto via a network, the terminal apparatus comprising: a first Web browser operable to perform browsing in response to operations by users; an apparatus manger operable to manage notification destination information including user names of the users and a location of the image processing apparatus; a transmitter operable to transmit pieces of URL information, each including a list of URLs accessed by one of the users using the first Web browser, to the location of the image processing apparatus indicated by the notification destination information, and the image processing apparatus comprising: a second Web browser operable to perform browsing in response to operations by the users; a receiver operable to receive the pieces of URL information transmitted by the transmitter; and a URL storing part operable to store the pieces of URL information in association with the user names.

In this structure, the image processing apparatus may further comprise an identifier operable to identify to a user name of one of the users that uses the second Web browser, wherein the second Web browser may read, from the stored pieces of URL information, a piece of URL information associated with the identified user name, and display a list of URLs included in the read piece of URL information in a browser window thereof.

With the stated structure, using the second browser, the user can easily access a desired URL that the user has accessed before with the first Web browser.

(15) Note that it is possible to reduce the management load and the transmission load by limiting the pieces of the URL information to be transmitted to those within a specific period, such as a period between the time of the transmission and a time that is a given period before the time of the transmission, and a period specified by the user.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus connectable to a terminal apparatus via a network, comprising:
    a control unit implemented in a processor;
    a Web browser operable to perform browsing in response to operations by users, and wherein the Web browser performs browsing of at least one URL in response to operations by one of the users;
    a URL manager operable to manage pieces of URL information each including a list of URLs accessed by the one of the users using the Web browser and a user name of the one of the users;
    a user terminal manager operable to manage notification destination information including user names of the users and locations of terminal apparatuses respectively corresponding to the user names;
    an extractor operable to extract a piece of the URL information that relates to a given one of the user names; and
    a transmitter operable to transmit the extracted piece of the URL information to one of the locations that corresponds to the given one of the user names indicated by the notification destination information, wherein the extracted piece of the URL information is different from the notification destination information;
    wherein the control unit controls at least one of the Web browser, the URL manager, the user terminal manager, the extractor and the transmitter,
    and wherein, in the URL information, each URL included in the list of the URLs has operation information indicating whether any of specific operations, including a print instruction, a transmission instruction and a download instruction, has been performed with respect to the URL.

2. The image processing apparatus of claim 1, wherein
    the notification destination information further includes directory paths respectively corresponding to the terminal apparatuses, each directory path indicating a location of a URL history of a Web browser belonging to one of the terminal apparatuses that corresponds to the directory path,
    the extractor extracts a list of URLs relating to the given one of the user names from the URL information, and
    the transmitter transmits the extracted list to one of the directory paths that corresponds to the given one of the user names indicated by the notification destination information.

3. The image processing apparatus of claim 1, wherein
    each piece of the URL information further includes a list of URLs registered with the Web browser by one of the users and a user name of the one of the users that has registered the URLs.

4. The image processing apparatus of claim 3, wherein
    the notification destination information further includes directory paths respectively corresponding to the terminal apparatuses, each directory path indicating a location of a URL address book of a Web browser belonging to one of the terminal apparatuses that corresponds to the URL address book,
    the extractor extracts a list of the registered URLs relating to the given one of the user names from the URL information, and
    the transmitter transmits the extracted list to one of the directory paths that corresponds to the given one of the user names indicated by the notification destination information.

5. The image processing apparatus of claim 1, wherein
    when one of the users ends the browsing or logs out,
    the extractor extracts a list of URLs that relates to the one of the users, and
    the transmitter starts transmission of the extracted list.

6. The image processing apparatus of claim 1, wherein
    each piece of the URL information further includes access date and time that correspond to the list of the URLs,
    when one of the users logs out,
    the extractor extracts a list of URLs that corresponds to access time and date included in a final login period of the one of the users from the URL information, and
    the transmitter starts transmission of the extracted list.

7. The image processing apparatus of claim 1, wherein the extractor extracts a list of URLs whose operation information indicates that any of the specific operations has been performed.

8. The image processing apparatus of claim 1, further comprising
    an input part, wherein
    the Web browser has a function of receiving a manual input of a URL via the input part,
    in the URL information, each URL included in the list of the URLs has operation information indicating whether the URL has been manually input, and
    the extractor extracts a list of URLs whose operation information indicates that the URL has been manually input.

9. The image processing apparatus of claim 1, further comprising:
    a scanner operable to scan a document to generate image data; and
    an uploader operable to upload the generated image data to an upload destination, wherein
    in the URL information, each URL included in the list of the URLs has operation information indicating whether upload has been performed with respect to the URL, and
    the extractor extracts a list of URLs whose operation information indicates that upload has been performed.

10. The image processing apparatus of claim 1, further comprising:
    an operation panel including a display subpart and an input subpart; and
    a menu part operable to display a menu on the display subpart to inquire whether to transmit the URL information, and receive a response to the inquiry via the input subpart, wherein
    the transmitter transmits the URL information only if the response to the inquiry is affirmative.

11. The image processing apparatus of claim 1, wherein the at least one URL is a Web page source and the Web page source is displayed as a Web page on the image processing apparatus and the terminal apparatus.

12. An image processing system including an image processing apparatus and a terminal apparatus connected thereto via a network,
the image processing apparatus comprising:
a control unit implemented in a processor;
a Web browser operable to perform browsing in response to operations by users and wherein the Web browser performs browsing of at least one URL in response to operations by one of the users;
a URL manager operable to manage pieces of URL information each including a list of URLs accessed by the one of the users using the Web browser and a user name of the one of the users;
a user terminal manager operable to manage notification destination information including user names of the users and locations of terminal apparatuses respectively corresponding to the user names;
an extractor operable to extract a piece of the URL information that relates to a given one of the user names; and
a transmitter operable to transmit the extracted piece of the URL information to one of the locations that corresponds to the given one of the user names indicated by the notification destination information, wherein the extracted piece of the URL information is different from the notification destination information;
wherein the control unit controls at least one of the Web browser, the URL manager, the user terminal manager, the extractor and the transmitter,
and wherein, in the URL information, each URL included in the list of the URLs has operation information indicating whether any of specific operations, including a print instruction, a transmission instruction and a download instruction, has been performed with respect to the URL.

13. An image processing system including an image processing apparatus and a terminal apparatus connected thereto via a network,
the image processing apparatus comprising:
a control unit implemented in a processor;
a Web browser operable to perform browsing in response to operations by users and wherein the Web browser performs browsing of at least one URL in response to operations by one of the users;
a URL manager operable to manage pieces of URL information each including a list of URLs accessed by the one of the users using the Web browser and a user name of the one of the users;
a user terminal manager operable to manage notification destination information including user names of the users and locations of terminal apparatuses respectively corresponding to the user names;
an extractor operable to extract a piece of the URL information that relates to a given one of the user names; and
a transmitter operable to transmit the extracted piece of the URL information to one of the locations that corresponds to the given one of the user names indicated by the notification destination information, wherein the extracted piece of the URL information is different from the notification destination information;
wherein the control unit controls at least one of the Web browser, the URL manager, the user terminal manager, the extractor and the transmitter,
and wherein, in the URL information, each URL included in the list of the URLs has operation information indicating whether any of specific operations, including a print instruction, a transmission instruction and a download instruction, has been performed with respect to the URL, and
the terminal apparatus comprises:
a Web browser operable to perform browsing in response to operations by the users;
a history directory operable to store a list of URLs accessed by one of the users using the Web browser;
a registration directory operable to store a list of URLs registered with the Web browser by one of the users;
a receiver operable to receive the piece of the URL information transmitted by the transmitter of the image processing apparatus;
a judgment part operable to judge whether any of the specific operations has been performed with respect to each URL; and
a save controller operable to save a list of URLs affirmatively judged by the judgment part into the registration directory, and to save a list of URLs negatively judged by the judgment part into the history directory.

14. An image processing apparatus connectable to a terminal apparatus via a network, comprising:
a control unit implemented in a processor;
a Web browser operable to perform browsing in response to operations by users, and wherein the Web browser performs browsing of at least one URL in response to operations by one of the users;
a URL storing part operable to store pieces of URL information each including a list of URLs accessed by the one of the users using the Web browser and a user name of the one of the users that has accessed the URLs; and
a provider operable to specify a user name of one of the users that uses a terminal apparatus from which a provision request has been transmitted, extract a piece of the URL information that relates to the specified user name, and provide the terminal apparatus with the extracted piece of the URL information, wherein the extracted piece of the URL information is different from the address of the terminal apparatus;
wherein the control unit controls at least one of the Web browser, the URL storing part and the provider,
and wherein, in the URL information, each URL included in the list of the URLs has operation information indicating whether any of specific operations, including a print instruction, a transmission instruction and a download instruction, has been performed with respect to the URL.

15. The image processing apparatus of claim 14, wherein the provider receives the provision request via a Web browser of the terminal apparatus, and provides the terminal apparatus with a Web page source including the extracted piece of the URL information.

16. An image processing apparatus connectable to a terminal apparatus having a first Web browser via a network, the image processing apparatus comprising:
a control unit implemented in a processor;
a second Web browser operable to perform browsing in response to operations by users, and wherein the second Web browser performs browsing of at least one URL in response to operations by one of the users;
a user terminal manager operable to manage acquisition source information including user names of the one of the users and locations of terminal apparatuses respectively corresponding to the user names;

an identifier operable to identify a user name of one of the users that uses the second Web browser; and an acquisition part operable to acquire a piece of URL information including a list of URLs accessed by the one of the users using the first Web browser, from one of the locations that corresponds to the user name, wherein the acquired piece of URL information is different from the location that corresponds to the user name;

wherein the control unit controls at least one of the second Web browser, the user terminal manager, the identifier and the acquisition part, and wherein, in the URL information, each URL included in the list of the URLs has operation information indicating whether any of specific operations, including a print instruction, a transmission instruction and a download instruction, has been performed with respect to the URL.

17. The image processing apparatus of claim 16, wherein the second Web browser reads the list of the URLs included in the acquired piece of the URL information, and displays the list in a browser window thereof.

18. An image processing system including an image processing apparatus and a terminal apparatus connected thereto via a network, the terminal apparatus comprising:
a first Web browser operable to perform browsing in response to operations by users, and wherein the first Web browser performs browsing of at least one URL in response to operations by one of the users;
an apparatus manager operable to manage notification destination information including user names of the users and a location of the image processing apparatus;
a transmitter operable to transmit pieces of URL information, each including a list of URLs accessed by the one of the users using the first Web browser, to the location of the image processing apparatus indicated by the notification destination information, wherein the transmitted piece of URL information is different from the address of the image processing apparatus, and wherein, in the URL information, each URL included in the list of the URLs has operation information indicating whether any of specific operations, including a print instruction, a transmission instruction and a download instruction, has been performed with respect to the URL; and the image processing apparatus comprising:
a control unit implemented in a processor;
a second Web browser operable to perform browsing in response to operations by the users;
a receiver operable to receive the pieces of URL information transmitted by the transmitter; and
a URL storing part operable to store the pieces of URL information in association with the user names;
wherein the control unit controls at least one of the second Web browser, the receiver and the URL storing part.

19. The image processing system of claim 18, further comprising an identifier operable to identify to a user name of one of the users that uses the second Web browser, wherein the second Web browser reads, from the stored pieces of URL information, a piece of URL information associated with the identified user name, and displays a list of URLs included in the read piece of URL information in a browser window thereof.

20. A non-transitory computer-readable recording medium that is readable by a computer connectable to an image processing apparatus via a network, and has recorded thereon a computer program that causes a computer to execute the following operations:

accessing URLs by performing browsing of at least one URL in response to operations by one of the users;

managing pieces of URL information each including a list of the URLs accessed by the one of the users;

managing notification destination information including user names of users of the image processing apparatus and a location of the image processing apparatus; and associating the pieces of URL information managed in the URL managing step with the user names and transmitting the pieces of URL information to the location of the image processing apparatus indicated by the notification destination information, wherein the transmitted piece of URL information is different from the address of the computer, and wherein, in the URL information, each URL included in the list of the URLs has operation information indicating whether any of specific operations, including a print instruction, a transmission instruction and a download instruction, has been performed with respect to the URL.

21. A method for transmitting browser configuration information used by an image processing apparatus connectable to a terminal apparatus via a network, the method comprising:

accessing URLs in response to operations by users, which includes performing browsing of at least one URL by one of the users;

managing pieces of URL information each including a list of URLs accessed by the one of the users using a Web browser and a user name of the one of the users that has accessed the URLs;

managing notification destination information including user names of the users and locations of terminal apparatuses respectively corresponding to the user names;

extracting a piece of the URL information that relates to a given one of the user names; and transmitting the extracted piece of the URL information to one of the locations that corresponds to the given one of the user names indicated by the notification destination information, wherein the extracted piece of the URL information is different from the address of the terminal apparatus, and wherein, in the URL information, each URL included in the list of the URLs has operation information indicating whether any of specific operations, including a print instruction, a transmission instruction and a download instruction, has been performed with respect to the URL.

* * * * *